(12) United States Patent
Saito

(10) Patent No.: US 12,346,619 B2
(45) Date of Patent: Jul. 1, 2025

(54) INFORMATION PROCESSING APPARATUS, CONTROL METHOD OF INFORMATION PROCESSING APPARATUS, AND PRINTING SYSTEM

(71) Applicant: CANON KABUSHIKI KAISHA, Tokyo (JP)

(72) Inventor: Kazuyuki Saito, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 5 days.

(21) Appl. No.: 17/708,584

(22) Filed: Mar. 30, 2022

(65) Prior Publication Data
US 2022/0334786 A1 Oct. 20, 2022

(30) Foreign Application Priority Data
Apr. 16, 2021 (JP) ................. 2021-069516

(51) Int. Cl.
*G06F 3/12* (2006.01)
(52) U.S. Cl.
CPC .......... *G06F 3/1288* (2013.01); *G06F 3/1205* (2013.01); *G06F 3/1225* (2013.01); *G06F 3/1226* (2013.01); *G06F 3/1253* (2013.01)
(58) Field of Classification Search
None
See application file for complete search history.

(56) References Cited

U.S. PATENT DOCUMENTS

2020/0004473 A1\* 1/2020 Saigusa ................. G06F 3/1232

FOREIGN PATENT DOCUMENTS

| JP | 2015228178 A | \* | 12/2015 |
| JP | 2020004158 A | | 1/2020 |
| JP | 2020184228 A | | 11/2020 |
| JP | 2021043547 A | \* | 3/2021 |
| JP | 2022139552 A | \* | 9/2022 |

\* cited by examiner

*Primary Examiner* — Fan Zhang
(74) *Attorney, Agent, or Firm* — Canon U.S.A., Inc. IP Division

(57) ABSTRACT

An information processing apparatus includes a controller including a processor, the controller configured to receive identification information of an image forming apparatus from the image forming apparatus, acquire information regarding a first print setting application based on the received identification information, transmit, to a server apparatus, an acquisition request of identification information of an image forming apparatus registered in the server apparatus, receive, from the server apparatus that has received the acquisition request, identification information of the image forming apparatus to which predetermined information is added, and acquire information regarding a second print setting application based on the received identification information of the image forming apparatus to which the predetermined information is added.

15 Claims, 21 Drawing Sheets

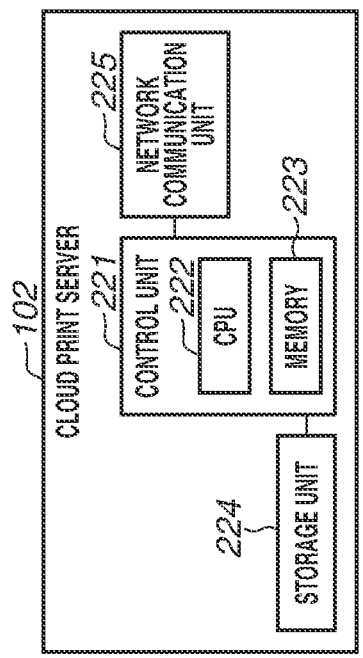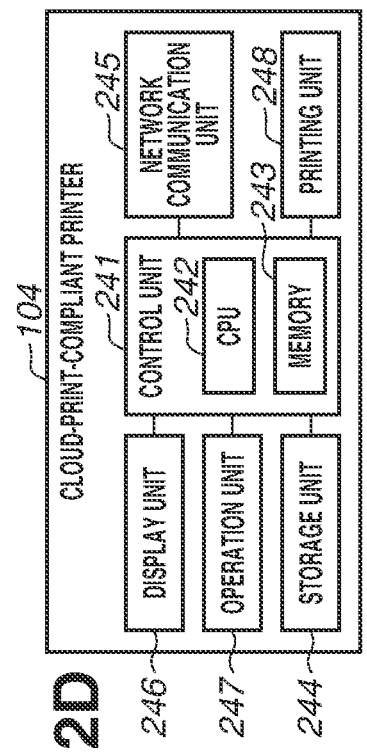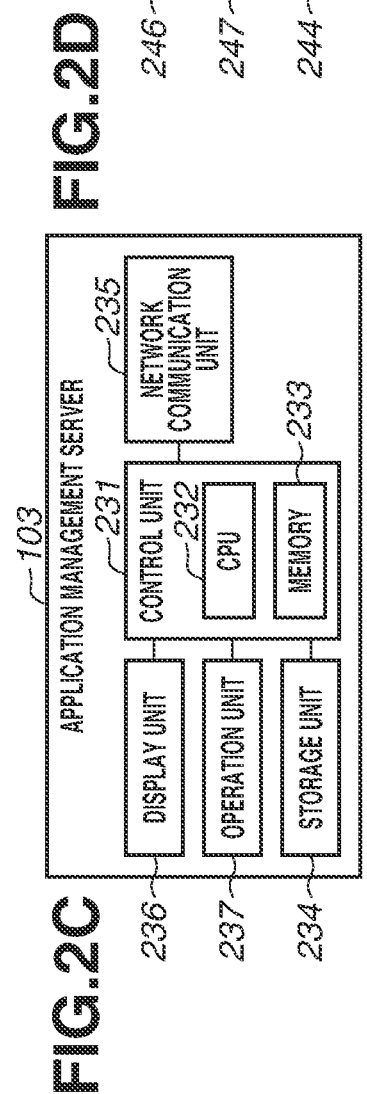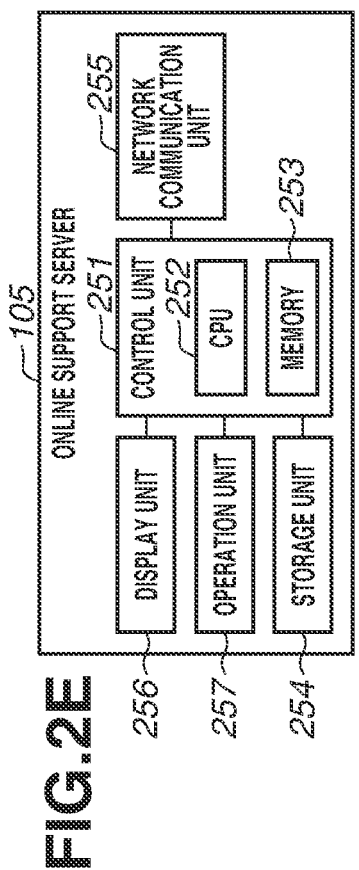

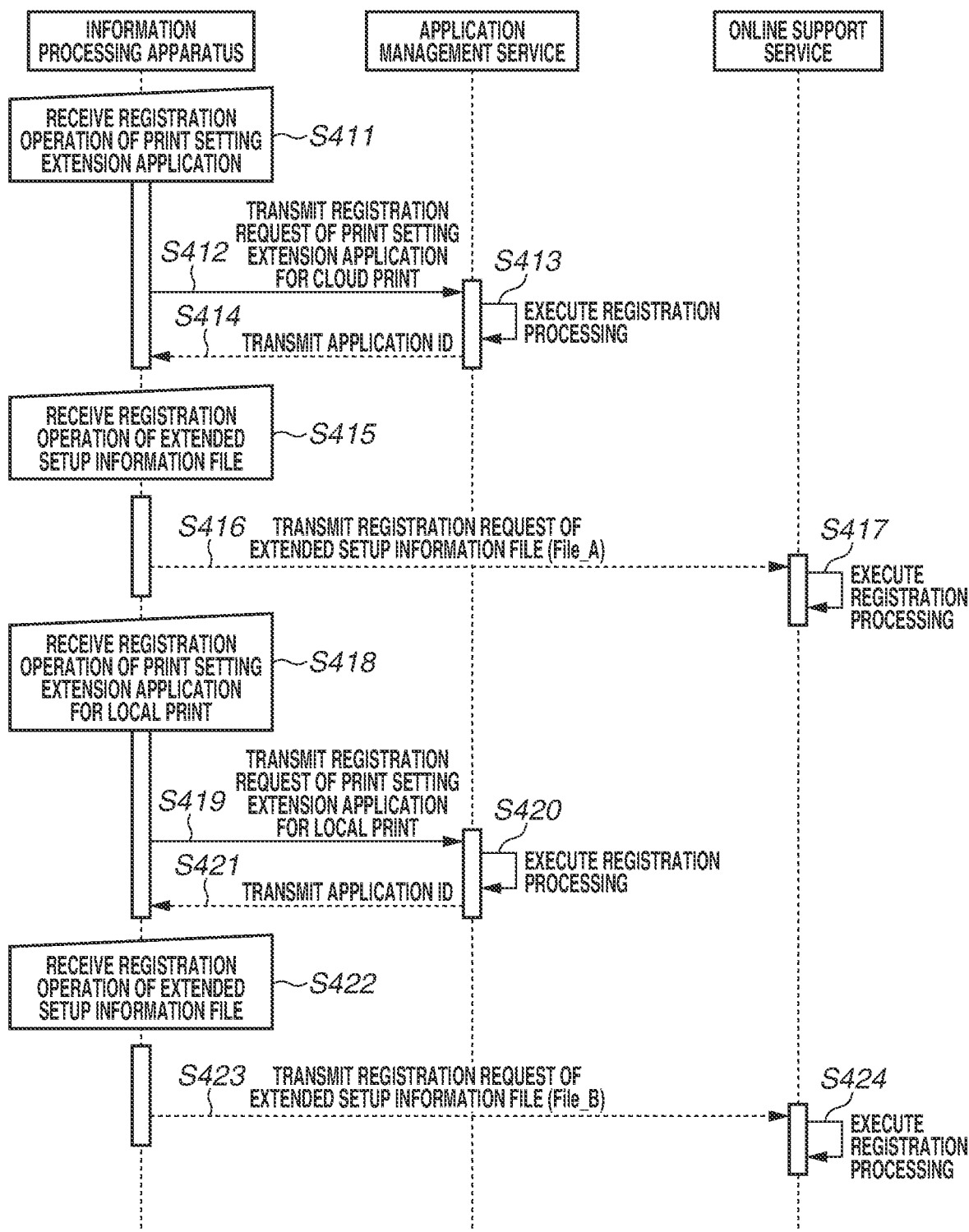

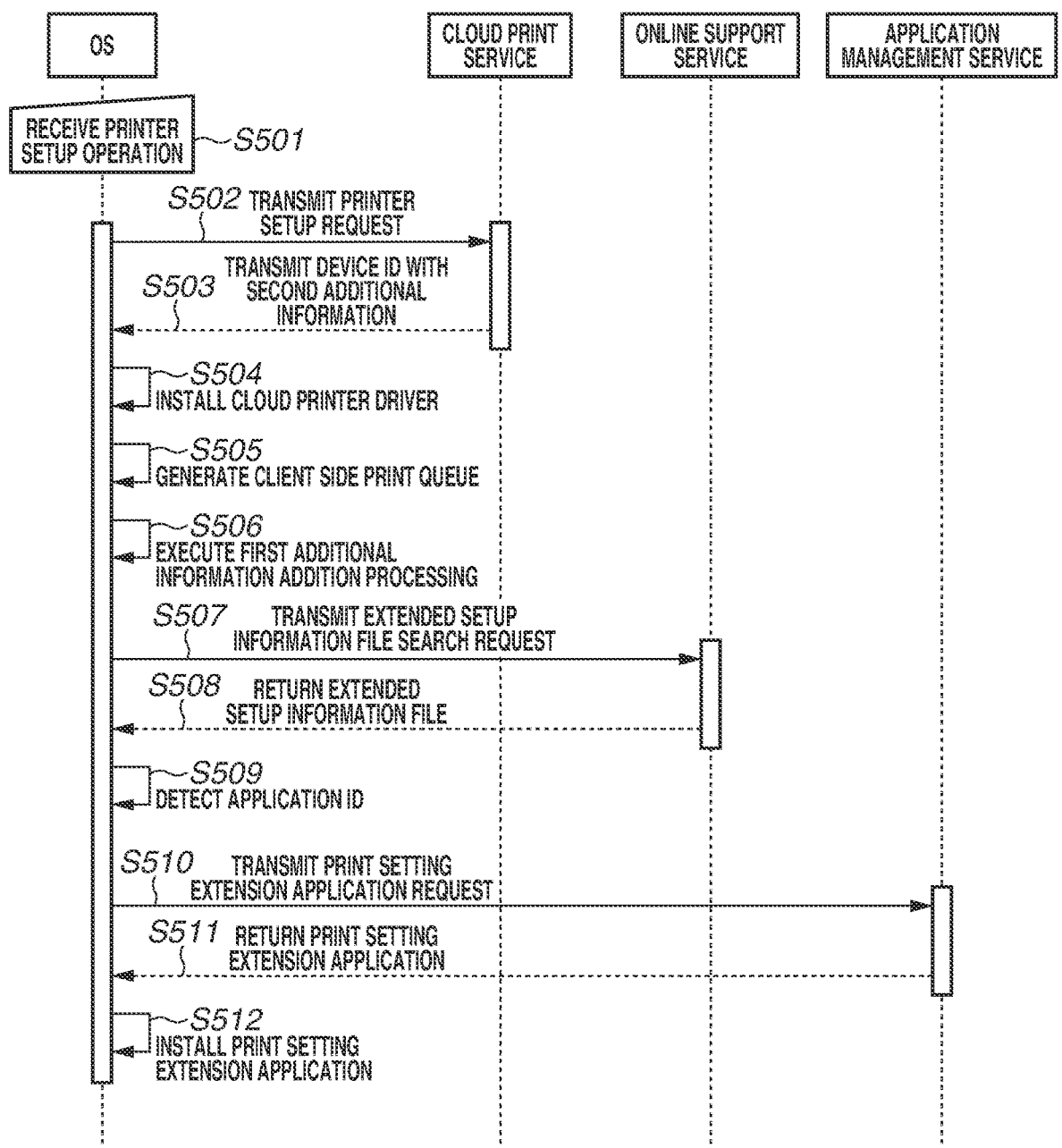

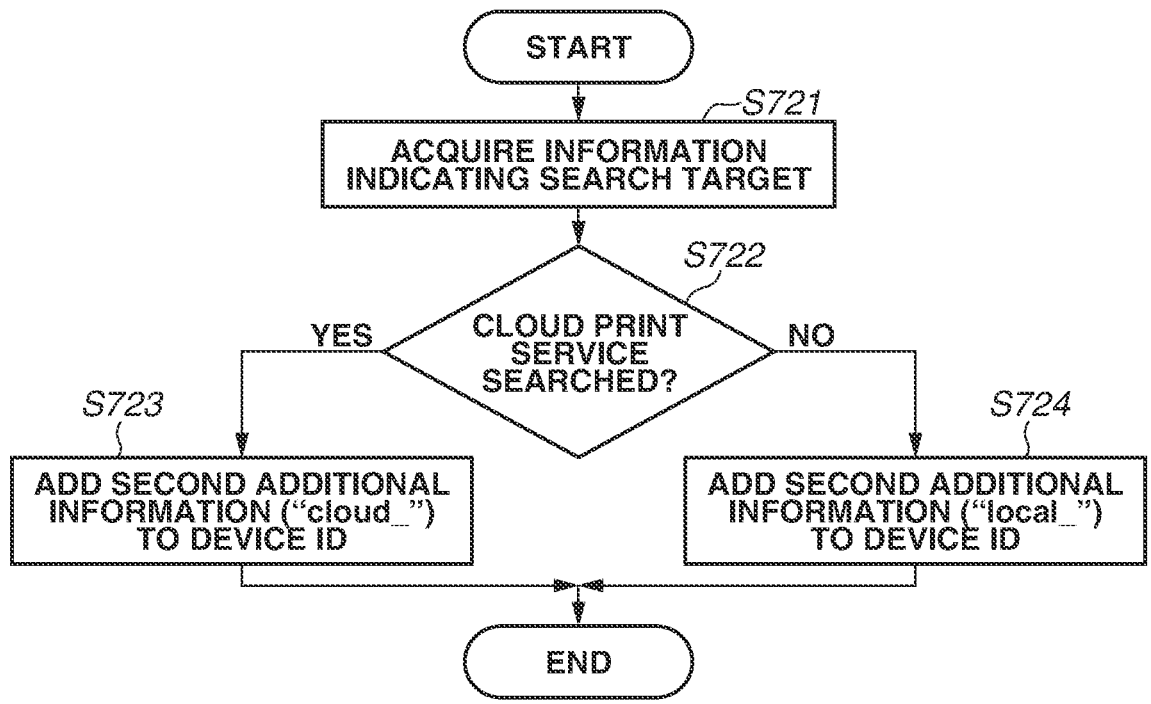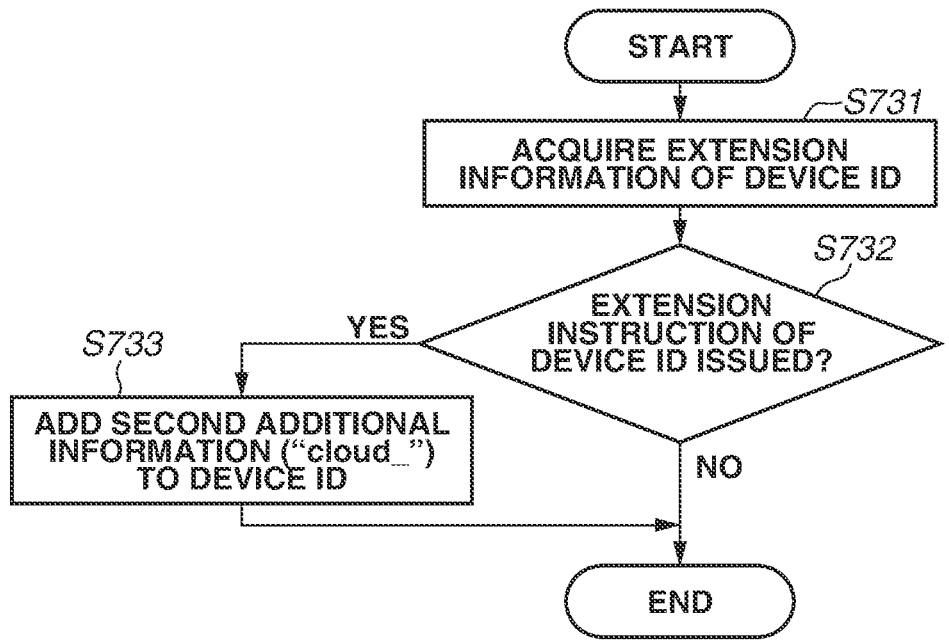

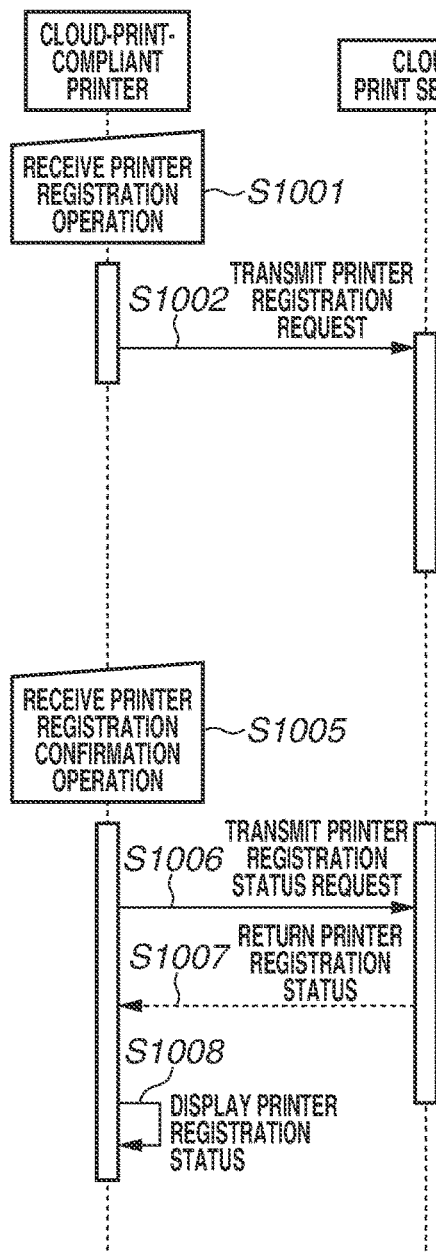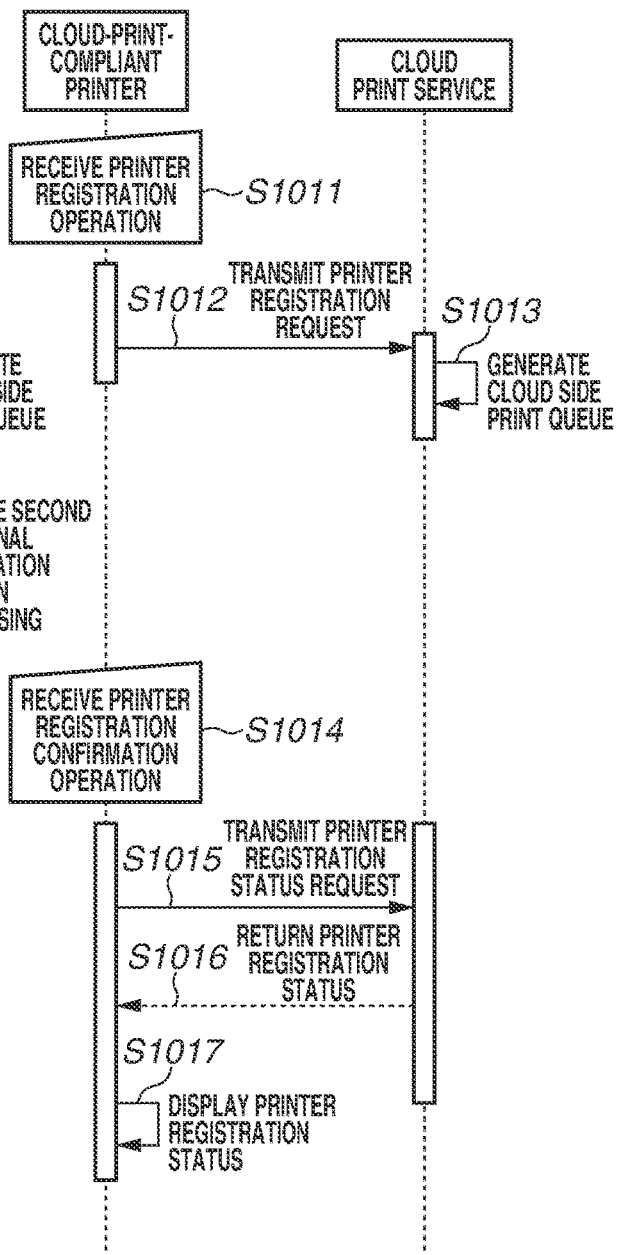

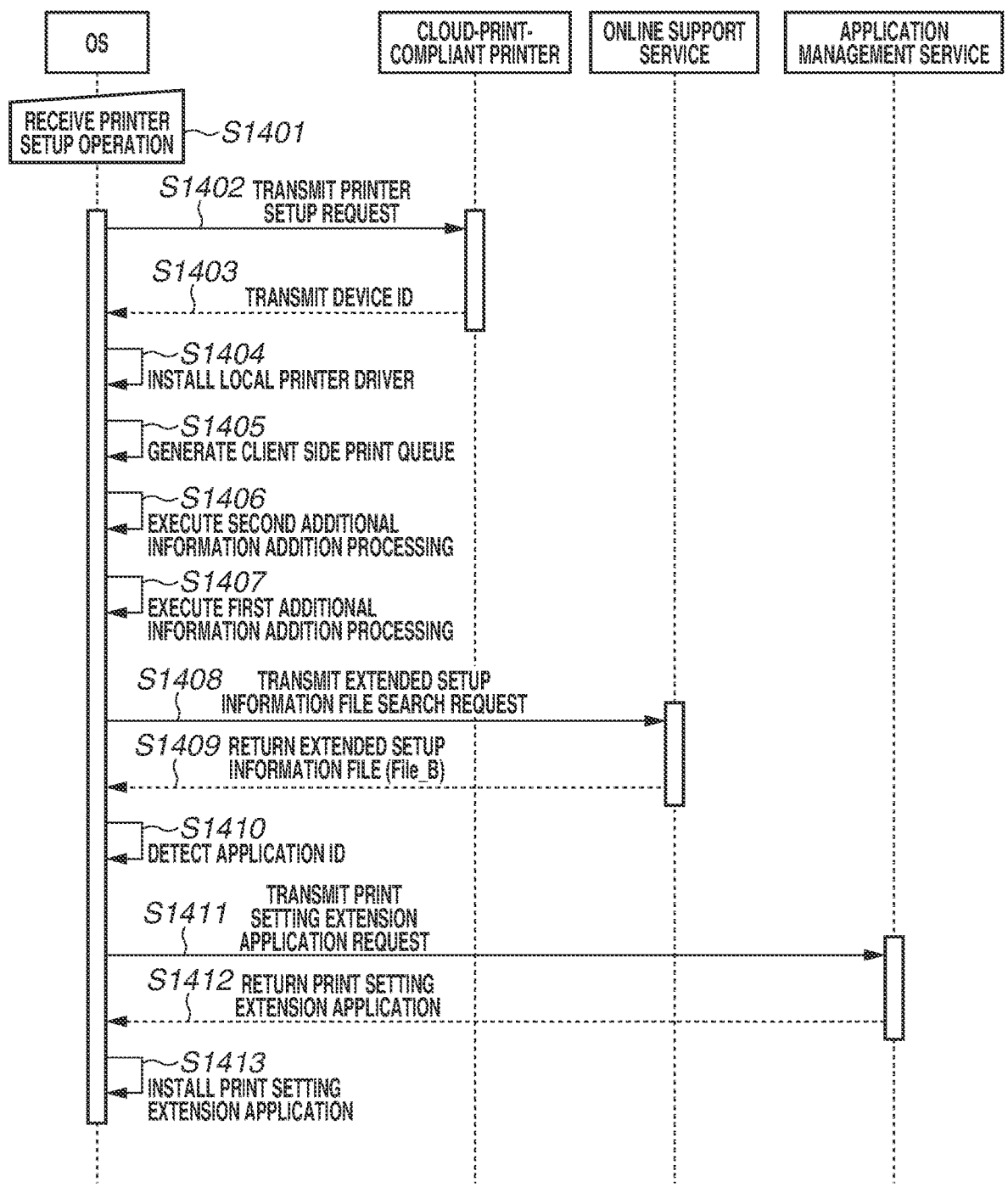

FIG.14A

<EXTENDED SETUP INFORMATION FILE>
<File_A>

AppID=000ABC

DEVICE ID=print_cloud_device001

FIG.14B

<EXTENDED SETUP INFORMATION FILE>
<File_B>

AppID=000EFG

DEVICE ID=print_device001

FIG.14C

<EXTENDED SETUP INFORMATION FILE>
<File_B>

AppID=000EFG

DEVICE ID=print_local_device001

FIG.14D

| DEVICE INFORMATION |
| --- |
| SECOND ADDITIONAL INFORMATION + DEVICE ID ~1601 |
| TENANT ID ~1602 |
| PRINTER NAME ~1603 |
| DEVICE CONFIGURATION INFORMATION ~1604 |
| CAPABILITY INFORMATION ~1605 |

FIG.15A  1701

| SHEET SIZE | POSTCARD ▼ |
| --- | --- |
| NUMBER OF COPIES | 1 |
| ORIENTATION OF PRINTING | PORTRAIT ▼ |
| TWO-SIDED PRINTING | ONE-SIDED ▼ |

| SHEET SIZE | POSTCARD ▼ |
| --- | --- |
| NUMBER OF COPIES | 1 |
| ORIENTATION OF PRINTING | PORTRAIT ▼ |
| TWO-SIDED PRINTING | ONE-SIDED ▼ |
| STAPLING | ON |
| PUNCHING | OFF |

SHEET SIZE   POSTCARD ▼

LOG INTO CLOUD PRINT SERVICE.

ACCOUNT ID: ********
PASSWORD: ********

EXTEND DEVICE ID  ON    1751

PRINT

1741 — Printer-A ▼
1742 — ADVANCED SETTING

PREVIEW

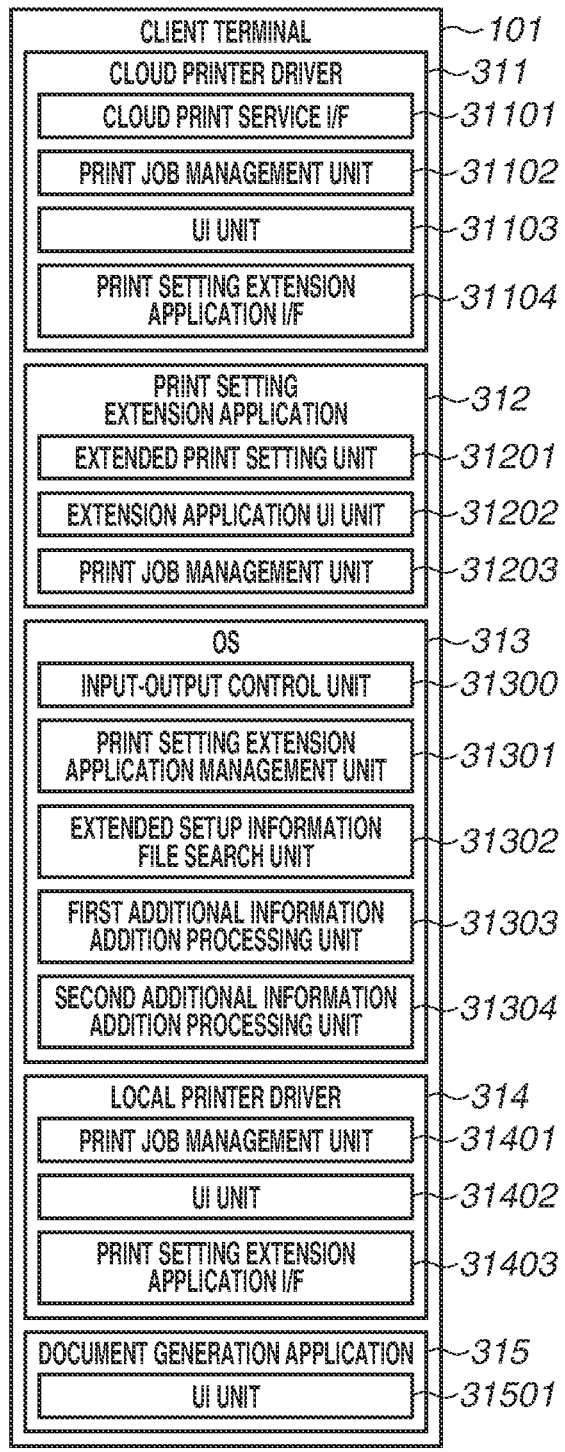
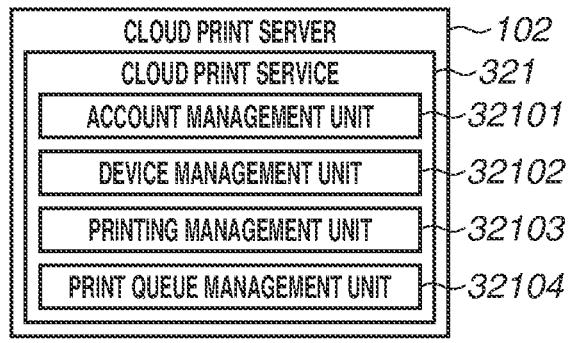
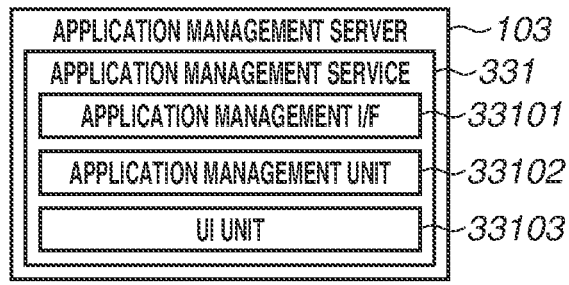
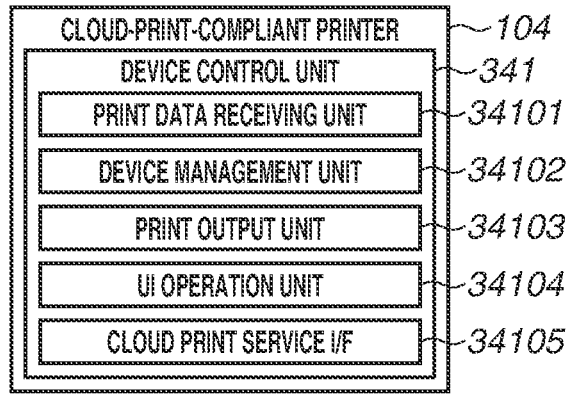
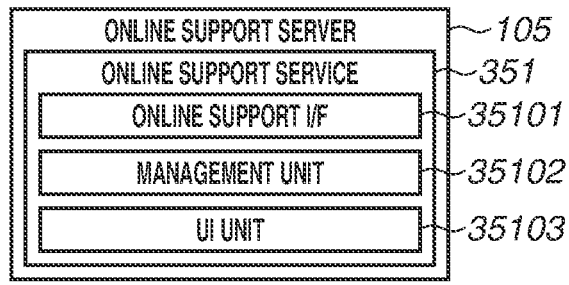

INFORMATION PROCESSING APPARATUS, CONTROL METHOD OF INFORMATION PROCESSING APPARATUS, AND PRINTING SYSTEM

BACKGROUND

Field of the Disclosure

The present disclosure relates to an information processing apparatus, a control method of an information processing apparatus, and a program.

Description of the Related Art

In recent years, a general-purpose printer driver that communicates with an image forming apparatus using an industry-standard protocol such as an internet printing protocol (IPP) has been considered. The general-purpose printer driver can communicate with printers provided by a plurality of printer vendors. Thus, by using the general-purpose printer driver, a user can transmit a print job to an image forming apparatus without installing a printer driver unique to a vendor.

Furthermore, printing that uses a cloud print service has been considered. In the cloud print service, a printer driver for the cloud print service is installed onto an information processing apparatus. The information processing apparatus transmits a print job to the cloud print service using the printer driver for the cloud print service, and the cloud print service transmits the print job to an image forming apparatus, whereby printing is executed.

Because the above-described general-purpose printer driver and the printer driver for the cloud print service handle print jobs to be printed by image forming apparatuses of various vendors, items and functions settable as a print setting are limited.

For this reason, Japanese Patent Application Laid-Open No. 2020-04158 discusses a technique of extending a print queue associated with a printer driver using identification information of a printer associated with the printer driver.

On the other hand, printing executed via a cloud print service and printing executed not via a cloud print service have different use applications. While the user might desire to use different print setting extension applications for these types of printing in some cases, the user might desire to use a print setting extension application only in either printing in other cases.

For example, cloud print is often used for business. Because a driver provided by a printer vendor cannot be used, print setting items are desired to be extended by a print setting extension application.

On the other hand, local print is often used by consumers. Because local print is expected to be executed mainly using a basic setting, not as many print setting items as those desired in cloud print are desired in some cases.

Normally, identification information for identifying a model and a type of an image forming apparatus is set for each image forming apparatus.

Thus, the same identification information is set to both of a print queue for inputting a print job via a cloud print service, and a print queue for inputting a print job not via a cloud print service. Consequently, the same print setting extension application might be associated with all print queues.

SUMMARY

According to embodiments of the present disclosure, an information processing apparatus includes a controller including a processor, the controller configured to receive identification information of an image forming apparatus from the image forming apparatus, acquire information regarding a first print setting application based on the received identification information, transmit, to a server apparatus, an acquisition request of identification information of an image forming apparatus registered in the server apparatus, receive, from the server apparatus that has received the acquisition request, identification information of the image forming apparatus to which predetermined information is added, and acquire information regarding a second print setting application based on the received identification information of the image forming apparatus to which the predetermined information is added.

Further features of the present disclosure will become apparent from the following description of exemplary embodiments with reference to the attached drawings.

BRIEF DESCRIPTION OF THE DRAWINGS

FIGS. 2A to 2E are diagrams each illustrating an example of a hardware configuration according to the present exemplary embodiment.

FIGS. 4A and 4B are diagrams each illustrating an example of a sequence of processing to be performed between each software component and a service in registering a print setting extension application according to the present exemplary embodiment.

FIG. 5 is a diagram illustrating an example of a sequence of processing to be performed between each software component and a service in adding a cloud print printer according to the first exemplary embodiment.

FIGS. 7A to 7D are flowcharts each illustrating an example of second additional information addition processing according to first, second, third, and fourth exemplary embodiments.

FIGS. 10A, 10B, and 10C are diagrams each illustrating an example of a sequence of processing to be performed between each software component and a service in registering a printer into a cloud print service according to the first, second, third, and fourth exemplary embodiments.

FIG. 12 is a diagram illustrating an example of a sequence of processing to be performed between each software component and a service in adding a local print printer according to the fourth exemplary embodiment.

FIGS. 14A to 14D are diagrams each illustrating an example of various types of data according to the first exemplary embodiment.

FIGS. 15A to 15E are diagrams each illustrating an example of a user interface (UI) of a print setting extension application according to the first exemplary embodiment.

FIGS. 16A to 16E are diagrams each illustrating an example of a software configuration according to the second exemplary embodiment.

DESCRIPTION OF THE EMBODIMENTS

Hereinafter, exemplary embodiments of the present disclosure will be described with reference to the drawings.

Figure 1:
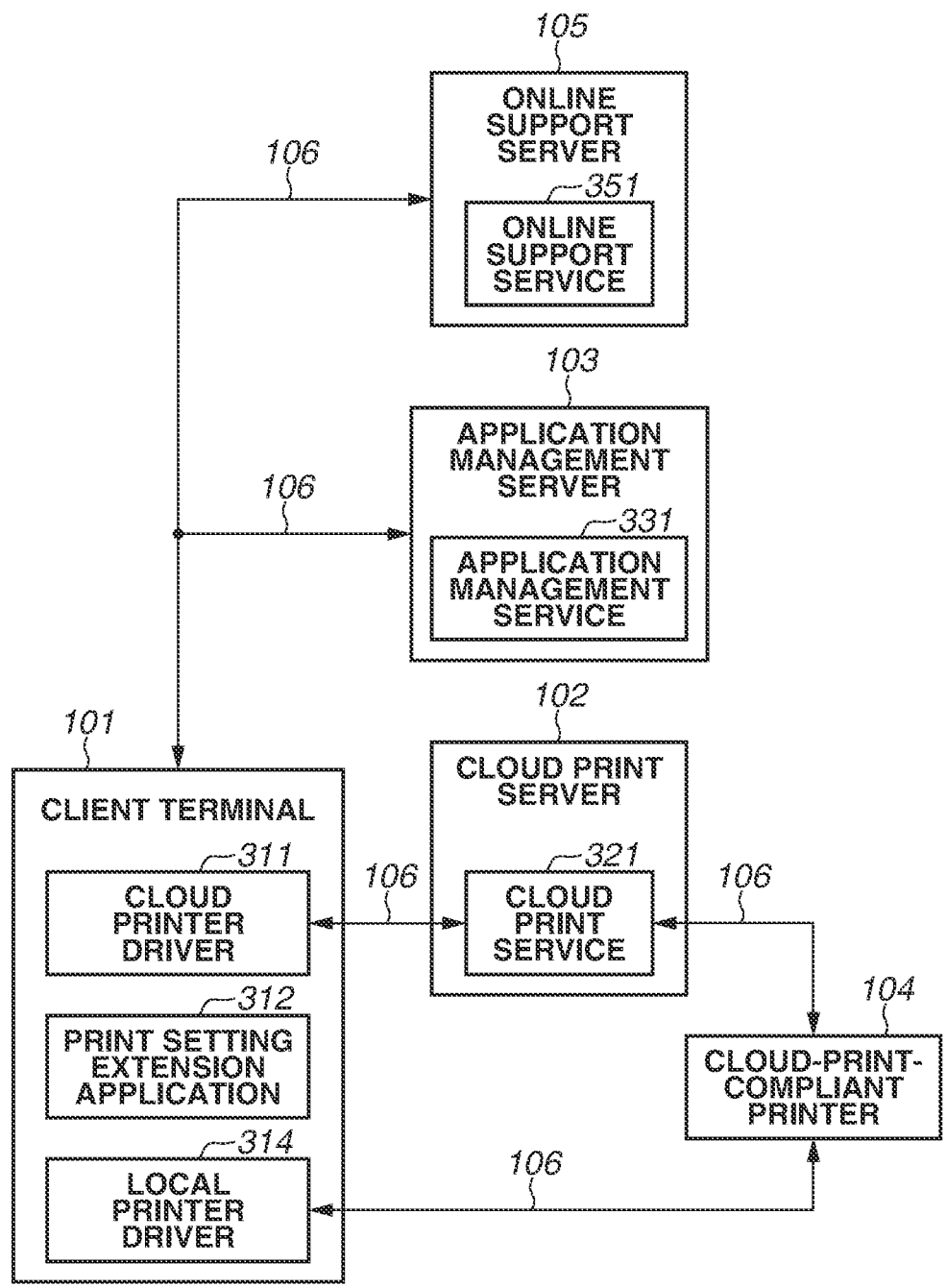
FIG. 1 is a diagram illustrating an example of a system configuration according to the present exemplary embodiment.

FIG. 1 illustrates a configuration diagram of a printing system in cloud print according to a first exemplary embodiment. A client terminal 101, a cloud print server 102, an application management server 103, a cloud-print-compliant printer 104, and an online support server 105 are connected via a network 106.

FIG. 1 illustrates one client terminal 101 and one cloud-print-compliant printer 104, but a plurality of client terminals 101 and a plurality of cloud-print-compliant printers 104 may be provided.

The cloud print server 102, the application management server 103, and the online support server 105 may be server systems each including a plurality of information processing apparatuses. By each server including a plurality of information processing apparatuses as a server system, load can be distributed to the plurality of information processing apparatuses.

Physically, the cloud print server 102, the application management server 103, and the online support server 105 may be virtually formed inside one information processing apparatus.

The network 106 that establishes connection to a cloud service is supposed to be a wide area network (WAN) such as the Internet, but all the networks 106 may be closed environments such as an intracompany local area network (LAN).

The client terminal 101 is an information processing apparatus such as a personal computer (PC), a tablet, or a smartphone, and is a terminal directly operated by the user. Arbitrary application software is made executable on the client terminal 101.

The cloud-print-compliant printer 104 is a device that actually performs printing onto a recording medium such as a sheet, and is an image forming apparatus that executes printing after converting print data received via the network 106, into image data.

The cloud-print-compliant printer 104 can receive print data from the client terminal 101 via the cloud print server 102, and can directly receive print data from the client terminal 101 not via the cloud print server 102.

The cloud-print-compliant printer 104 receives print data generated by a cloud printer driver 311 of the client terminal 101, via the cloud print server 102. The cloud-print-compliant printer 104 also receives print data generated by a local printer driver 314 of the client terminal 101, not via the cloud print server 102.

The cloud print server 102 receives printing instructions and document data from the outside. After converting the received document data into print data, the cloud print server 102 transmits the print data to a predetermined cloud-print-compliant printer 104.

The application management server 103 stores and manages various applications.

The application management server 103 receives identification information and a download request of an application from the client terminal 101, and transmits the application identified based on the received identification information, to the client terminal 101.

The online support server 105 is a server apparatus that provides an online support service 351. The online support service 351 is a service for providing the client terminal 101 with a file in which information for extending functions of the client terminal 101 is described.

Next, a hardware configuration of a system according to the present exemplary embodiment will be described with reference to FIGS. 2A to 2E.

FIG. 2A is a block diagram illustrating a hardware configuration of the client terminal 101.

The client terminal 101 includes a display unit 216, an operation unit 217, a storage unit 214, a control unit 211, and a network communication unit 215.

The storage unit 214 refers to a nonvolatile storage device such as a hard disk or a solid state drive (SSD), and can store and rewrite digital data.

The control unit 211 includes a central processing unit (CPU) 212 and a memory 213, and controls operations of the entire client terminal 101. The CPU 212 loads a program stored in the storage unit 214 onto the memory 213, and executes the program. The memory 213 is a main storage memory of the CPU 212, and is used as a work area or a temporary storage region for loading various programs.

The network communication unit 215 is a device that communicates with the external network 106, and performs input-output of digital data with an external server or client terminal via the network 106.

The display unit 216 is a device such as a liquid crystal display for displaying visual information to the user in real time. The operation unit 217 is a device for receiving entry from the user via a keyboard or a mouse. A device such as a touch panel that has functions of both the display unit 216 and the operation unit 217 may be used.

FIG. 2B is a block diagram illustrating a hardware configuration of the cloud print server 102. The cloud print server 102 includes a storage unit 224, a control unit 221, and a network communication unit 225.

Because the storage unit 224, the control unit 221, and the network communication unit 225 are equivalent to those of the client terminal 101, the description thereof will be omitted.

The description will be given assuming that the cloud print server 102 includes one information processing apparatus having the hardware configuration illustrated in FIG. 2B, but the cloud print server 102 may include a plurality of information processing apparatuses each having the hardware configuration illustrated in FIG. 2B.

FIG. 2C is a block diagram illustrating a hardware configuration of the application management server 103. The application management server 103 includes a display unit 236, an operation unit 237, a storage unit 234, a control unit 231, and a network communication unit 235.

Because the display unit 236, the operation unit 237, the storage unit 234, the control unit 231, and the network communication unit 235 are equivalent to those of the client terminal 101, the description thereof will be omitted.

The description will be given assuming that the application management server 103 includes one information processing apparatus having the hardware configuration illustrated in FIG. 2C, but the application management server 103 may include a plurality of information processing apparatuses.

FIG. 2D is a block diagram illustrating a hardware configuration of the cloud-print-compliant printer 104. The cloud-print-compliant printer 104 includes a display unit 246, an operation unit 247, a storage unit 244, a control unit 241, a network communication unit 245, and a printing unit 248.

The display unit 246 is a device such as a touch panel or a light-emitting diode (LED) that is attached to the cloud-print-compliant printer 104, for displaying information to the user in real time.

The operation unit 247 is a device for receiving entry from the user, and sometimes includes hardware keys such as a numerical keypad in addition to a touch panel. Because the storage unit 244 and the control unit 241 are equivalent to those of the client terminal 101, the description thereof will be omitted.

The network communication unit 245 is a device that communicates with the external network 106, and mainly has roles of receiving print data, and transmitting a state of the cloud-print-compliant printer 104 such as an error to an external server.

The printing unit 248 is a device that performs print processing onto sheets prepared in a cassette or a tray, by performing a series of operations including sheet feeding, printing, and sheet discharge. A printing method is not specifically limited, and may be an electrophotographic method or an inkjet method. A two-sided printing unit and a finishing device that are to be used at the time of sheet discharge are also included in the printing unit 248. The finishing device performs stapling and punching processing.

In the present exemplary embodiment, a single-function printer having only a print function has been described as an example of the cloud-print-compliant printer 104, but a multifunction printer (multifunction peripheral) also having a scanner function and a FAX function may be used.

FIG. 2E is a hardware block diagram illustrating the details of the online support server 105. In the present exemplary embodiment, the description will be given assuming that the online support server 105 includes one information processing apparatus, but the online support server 105 may include a plurality of information processing apparatuses. The online support server 105 includes a display unit 256, an operation unit 257, a storage unit 254, a control unit 251, and a network communication unit 255. Because the display unit 256 and the operation unit 257 are similar to the display unit 216 and the operation unit 217 of the client terminal 101, the description thereof will be omitted. The storage unit 254 is a memory device such as a hard disk drive (HDD) or an SSD. The storage unit 254 stores a file in which information for extending functions provided by the client terminal 101 is described.

The control unit 251 includes a CPU 252 and a memory 253. The CPU 252 controls operations of the entire online support server 105. The memory 253 is used in processing executed by the CPU 252. The network communication unit 255 is an interface for the online support server 105 communicating with the client terminal 101. Via the network communication unit 255, the online support server 105 receives an acquisition request of a file stored in the storage unit 254, and transmits a corresponding file to the client terminal 101.

Next, a software configuration of the system according to the present exemplary embodiment will be described with reference to FIGS. 3A to 3E.

Figure 3A:
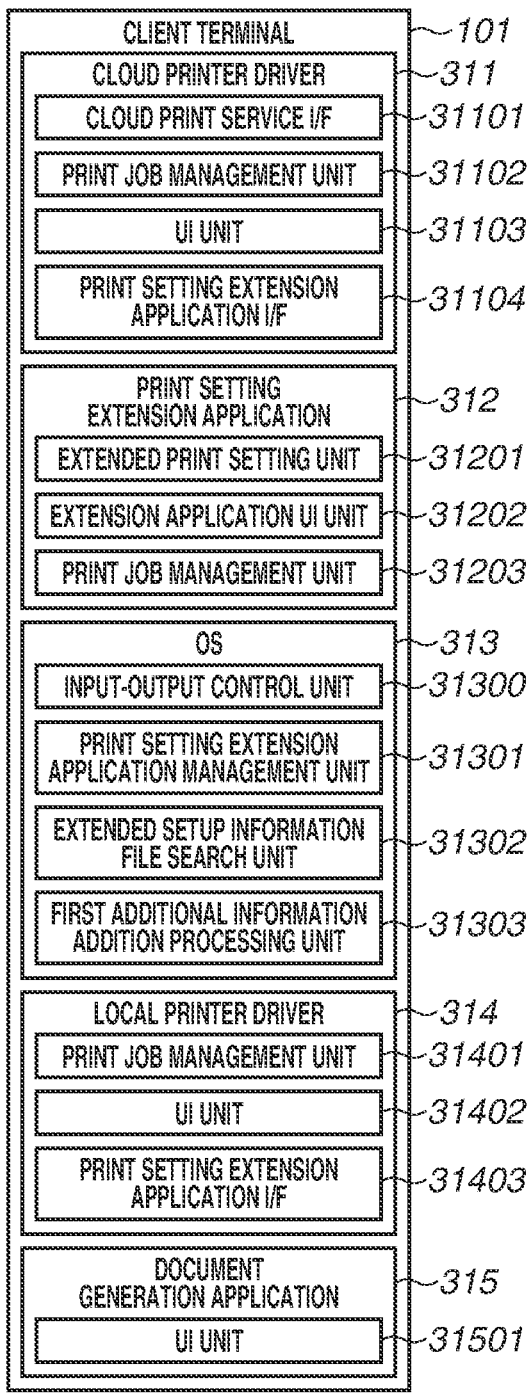
FIGS. 3A to 3E are diagrams each illustrating an example of a software configuration according to the first exemplary embodiment.

FIG. 3A is a block diagram illustrating a software configuration of the client terminal 101.

The client terminal 101 includes the cloud printer driver 311, a print setting extension application 312, an operating system (OS) 313, the local printer driver 314, and a document generation application 315.

The cloud printer driver 311 includes a cloud print service interface (I/F) 31101, a print job management unit 31102, a user interface (UI) unit 31103, and a print setting extension application I/F 31104.

The cloud print service I/F 31101 processes the communication of data and commands that is performed with a cloud print service 321. The cloud print service I/F 31101 transmits print data to the cloud print service 321 and receives printer information from the cloud print service 321.

The print job management unit 31102 performs processing such as generation of a print job and transmission of a print job.

The UI unit 31103 has roles of displaying a print setting screen prepared by the cloud printer driver 311, and receiving a user operation from the client terminal 101.

The print setting extension application I/F 31104 processes the communication of data and commands that is performed with the print setting extension application 312.

The print setting extension application 312 includes an extended print setting unit 31201, an extension application UI unit 31202, and a print job management unit 31203.

The extended print setting unit 31201 manages a function setting unique to a printer vendor that is not supported by the cloud printer driver 311 and the local printer driver 314.

The extension application UI unit 31202 has roles of displaying a print setting screen prepared by the print setting extension application 312, and receiving a user operation from the client terminal 101.

The print job management unit 31203 performs processing such as generation of a print job, editing of print jobs generated by the cloud printer driver 311 and the local printer driver 314, and transmission of a print job.

The OS 313 includes an input-output control unit 31300, a print setting extension application management unit 31301, an extended setup information file search unit 31302, and a first additional information addition processing unit 31303.

The input-output control unit 31300 receives an operation performed by the user of the client terminal 101.

The print setting extension application management unit 31301 manages the installing of the print setting extension application 312, and processes the communication of data and commands. The print setting extension application management unit 31301 searches an application management service 331 for the print setting extension application 312 using an application ID (AppID) extracted from an extended setup information file (FIGS. 14A, 14B, and 14C).

The extended setup information file search unit 31302 searches the online support service 351 for an extended setup information file including a device ID identical to a device ID held by the OS 313 as a search key. Then, the extended setup information file search unit 31302 downloads a file found by the search.

The first additional information addition processing unit 31303 adds first additional information indicating large classification of an application, to a device ID. In the present exemplary embodiment, the large classification of an application is the classification of the type of an application adapted to a connected device. In the case of an application adapted to a printer, additional information indicating "print_" is added to a device ID. The "print_" is an example, and may be another character string, numbers, or symbols.

The local printer driver 314 includes a print job management unit 31401, a UI unit 31402, and a print setting extension application I/F 31403.

The print job management unit 31401 performs processing such as generation of a print job and transmission of a print job.

The UI unit 31402 has roles of displaying a print setting screen prepared by the local printer driver 314, and receiving a user operation from the client terminal 101.

The print setting extension application I/F 31104 processes the communication of data and commands that is performed with the print setting extension application 312.

The document generation application 315 includes a UI unit 31501, and is an application having functions of creating, editing, and displaying documents. The document generation application 315 may be an application having only a display function of document data.

Figure 3B:
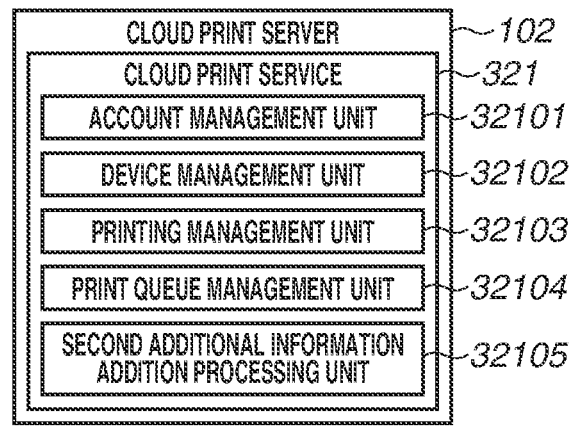

FIG. 3B is a block diagram illustrating a software configuration of the cloud print server 102.

An account management unit 32101 manages the authentication of tenants and users that have already been registered in the cloud print service 321.

A device management unit 32102 manages device information regarding a printer already registered in the cloud print service 321. Examples of device information includes a device ID, a tenant ID, a printer name, device configuration information, and capability information. The device information will be described below with reference to FIG. 14D.

A printing management unit 32103 determines whether to permit a print job delivery request from the cloud-print-compliant printer 104, and manages the delivery of a print job.

A print queue management unit 32104 receives a print job from the outside, and stores the received print job into a region prepared within the storage unit 224 of the cloud print server 102.

A second additional information addition processing unit 32105 adds second additional information indicating fine classification of an application, to a device ID.

In the present exemplary embodiment, the fine classification of an application is the classification of the type of a print queue with which an application is to be associated. If a print queue with which an application is to be associated is a print queue of cloud print, additional information indicating "cloud_" is added to a device ID.

The "cloud_" is an example, and may be another character string, numbers, or symbols.

Figure 3C:
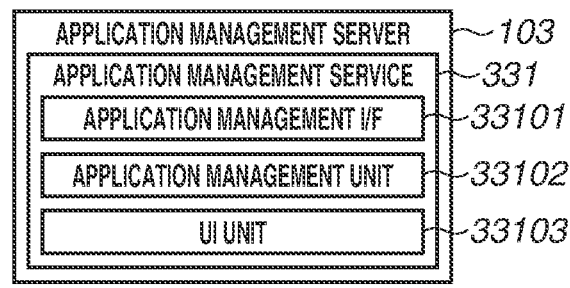

FIG. 3C is a block diagram illustrating a software configuration of the application management server 103.

The application management server 103 includes the application management service 331. The application management service 331 further includes an application management I/F 33101, an application management unit 33102, and a UI unit 33103.

The application management I/F 33101 processes the communication of data and commands that is performed with the OS 313 of the client terminal 101.

The application management unit 33102 manages applications registered in the application management service 331. The application management unit 33102 also issues an application ID when an application is newly registered into the application management service 331.

The UI unit 33103 has roles of displaying a UI prepared by the application management service 331, and receiving a user operation performed on the application management server 103.

Figure 3D:
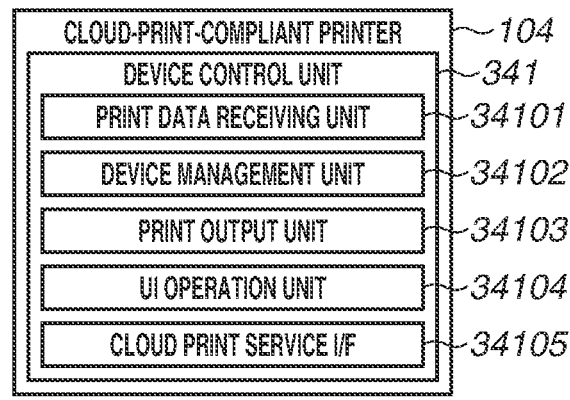

FIG. 3D is a block diagram illustrating a software configuration of a device control unit 341 of the cloud-print-compliant printer 104.

A print data receiving unit 34101 receives print data transmitted from the outside via the network 106, and stores the received print data into the storage unit 244 of the cloud-print-compliant printer 104.

A device management unit 34102 manages an option connected to the cloud-print-compliant printer 104, capability information, a sheet remaining amount, and an ink/toner remaining amount.

A print output unit 34103 controls print processing to be performed onto a recording medium such as a sheet.

A UI operation unit 34104 displays a UI on the operation unit 247 of the cloud-print-compliant printer 104, and acquires instructions and information entered via the UI.

A cloud print service I/F unit 34105 processes the communication of data and commands that is performed with the cloud print service 321.

Figure 3E:
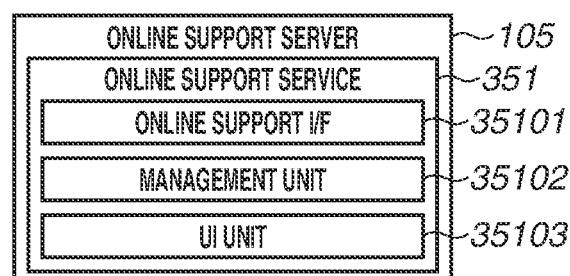

FIG. 3E is a block diagram illustrating a software configuration of the online support server 105. The online support server 105 includes the online support service 351.

The online support service 351 includes an online support I/F 35101, a management unit 35102, and a UI unit 35103.

The online support I/F 35101 processes the communication of data and commands that is performed with the OS 313 of the client terminal 101. The online support I/F 35101 receives a search request of a file for extending functions of the client terminal 101, from the client terminal 101, and transmits a response to the search request to the client terminal 101.

The management unit 35102 manages an extended setup information file registered in the online support service 351. The extended setup information file is a file in which information for extending the functions of the client terminal 101 is described. For example, a printer ID of the cloud-print-compliant printer 104 of the client terminal 101, and application identification information of the print setting extension application 312 for extending the cloud printer driver 311 are stored.

The UI unit 33103 has roles of displaying a UI prepared by the online support service 351, and receiving a user operation performed on the online support server 105.

Next, an example of a procedure to be taken by a print setting extension application registration operator or the user and a sequence of processing to be performed between each software component and a service according to the present exemplary embodiment will be described with reference to FIGS. 4A, 5, 6, 7A, 10A, 13A, and 14A to 14D.

In the present exemplary embodiment, the description will be given of an example in which second additional information addition processing is performed in the cloud print service 321.

First of all, an example of processing of registering the print setting extension application 312 into the application management service 331, and registering an extended setup information file into the online support service 351 will be described below with reference to FIG. 4A. The description will be given assuming that an application registration operator uploads an application to the application management server 103 from an information processing apparatus. The information processing apparatus may be the client terminal 101 or may be another information processing apparatus.

The description will be given of an example case of uploading the print setting extension application 312 that extends a print setting of the cloud printer driver 311 preinstalled on the client terminal 101, to the application management service 331.

First of all, in step S401, the information processing apparatus receives a print setting extension application registration operation performed by a print setting extension application registration operator.

Next, in step S402, the information processing apparatus transmits a registration request of the print setting extension application 312 for extending a print setting of the cloud printer driver 311, to the application management service 331.

Next, in step S403, the application management service 331 registers the print setting extension application 312 into the storage unit 234, and generates an application ID being identification information of the registered print setting extension application 312.

In step S404, the application management service 331 transmits the generated application ID to the information processing apparatus that has transmitted the application registration request.

In step S405, the information processing apparatus receives a generation operation of an extended setup information file created by the print setting extension application registration operator. The application registration operator creates an extended setup information file in which the generated application ID is described. The generated application ID and a character string are described in the extended setup information file. The character string is set by adding second additional information to a printer ID (printer IDs) of one or a plurality of printers for which print settings can be made using the application.

FIG. 14A illustrates an example of an extended setup information file in which a device ID is described considering that "second additional information is added to a device ID of a cloud print printer in second additional information addition processing". In this example, an application ID (AppID) of a print setting extension application for cloud print is "000ABC". The device ID is set to "print_cloud_device001" considering that first additional information "print_" and second additional information "cloud_" are added.

In step S406, the information processing apparatus transmits a registration request of the extended setup information file to the online support service 351.

In step S407, the online support service 351 registers the extended setup information file.

In the above-described manner, the print setting extension application 312 is registered into the application management service 331. Furthermore, an extended setup information file for extending the cloud printer driver 311 using the registered print setting extension application 312 is registered into the online support service 351.

Next, a procedure to be taken by the user in registering the cloud-print-compliant printer 104 into the cloud print service 321 will be described with reference to FIG. 10A.

First of all, in step S1001, the cloud-print-compliant printer 104 receives, from the user via the UI operation unit 34104, a printer registration operation for registering the cloud-print-compliant printer 104 into the cloud print service 321.

Next, in step S1002, the cloud-print-compliant printer 104 transmits a printer registration request to the cloud print service 321 together with a device ID of the printer. The device ID transmitted to the cloud print service 321 in this step is a hardware ID (HWID) allocated to a printer for each model, for example. The device ID may be any information as long as a model of a printer can be identified from the information. If the cloud print service 321 receives the registration request, the cloud print service 321 transmits a uniform resource locator (URL) of the cloud print service 321 for printer registration to the cloud-print-compliant printer 104. The user accesses the URL from the cloud-print-compliant printer 104 or an information processing apparatus, enters a user ID and a password for using the cloud print service 321, and logs into the cloud print service 321. If the login of the user succeeds, the cloud print service 321 transmits an acquisition request of information necessary for printer registration, to the cloud-print-compliant printer 104. In response to the request, the cloud-print-compliant printer 104 transmits printer information to the cloud print service 321.

Next, in step S1003, the cloud print service 321 that has received the printer registration request registers information regarding the cloud-print-compliant printer 104, and generates a print queue for the cloud-print-compliant printer 104.

Next, in step S1004, the cloud print service 321 performs second additional information addition processing on the received device ID. The details of the second additional information addition processing (step S1004) will be described below with reference to FIG. 7A. If the processing in steps S1003 and S1004 is completed, device information illustrated in FIG. 14D is registered into the cloud print service 321. A device ID with second additional information 1601 is a character string set by adding second additional information to the device ID acquired from the cloud-print-compliant printer 104. A tenant ID 1602 is identification information for identifying a tenant to which users who can use the cloud-print-compliant printer 104 identified by the device information belong. A tenant refers to a group including one or a plurality of users. A printer name 1603 is a name of a printer that has transmitted a registration request. The printer name is acquired from the cloud-print-compliant printer 104 in step S1001 of FIG. 10A or based on an acquisition request from the cloud print service 321, and is used as a name of a print queue. The printer name may be set by another method. Device configuration information 1604 is information indicating a hardware configuration of the cloud-print-compliant printer 104. The information indicating a hardware configuration includes information such as information indicating whether a two-sided printing unit is attached to the cloud-print-compliant printer 104, information indicating whether a finisher that can perform stapling is attached, or information indicating whether a finisher that can perform punching is attached. The device configuration information is acquired in response to an acquisition request of capability information that is transmitted from the cloud print service 321 to the cloud-print-compliant printer 104 in step S1003 of FIG. 10A. Capability information 1605 is capability information of the cloud-print-compliant printer 104. The capability information is information indicating a function executable by the cloud-print-compliant printer 104, such as information indicating whether color printing is executable, information indicating whether two-sided printing is executable, and information indicating whether a toner saving mode is usable. The capability information is also acquired by the cloud print service 321 transmitting an acquisition request of capability information to the cloud-print-compliant printer 104 in step S1003 of FIG. 10A.

Referring back to FIG. 10A, in step S1005, the cloud-print-compliant printer 104 receives, via the UI operation unit 34104, a printer registration confirmation operation performed by the user. Next, in step S1006, the cloud-print-compliant printer 104 transmits a printer registration status request to the cloud print service 321. Next, in step S1007, the cloud print service 321 returns a printer registration status to the cloud-print-compliant printer 104. Then, in step S1008, the cloud-print-compliant printer 104 displays the printer registration status on the UI operation unit 34104. Because the processing in steps S1005 to S1008 is a method for confirming whether information regarding the cloud-print-compliant printer 104 has been registered in the cloud print service 321, the processing needs not be always performed.

Next, the details of the second additional information addition processing (step S1004) executed by the cloud print service 321 will be described below with reference to FIG. 7A. All the processing illustrated in FIG. 7A is implemented by programs of the cloud print service 321 that are stored in the storage unit 224 of the cloud print server 102, being loaded onto the memory 223 and executed by the CPU 222.

Figure 7A:
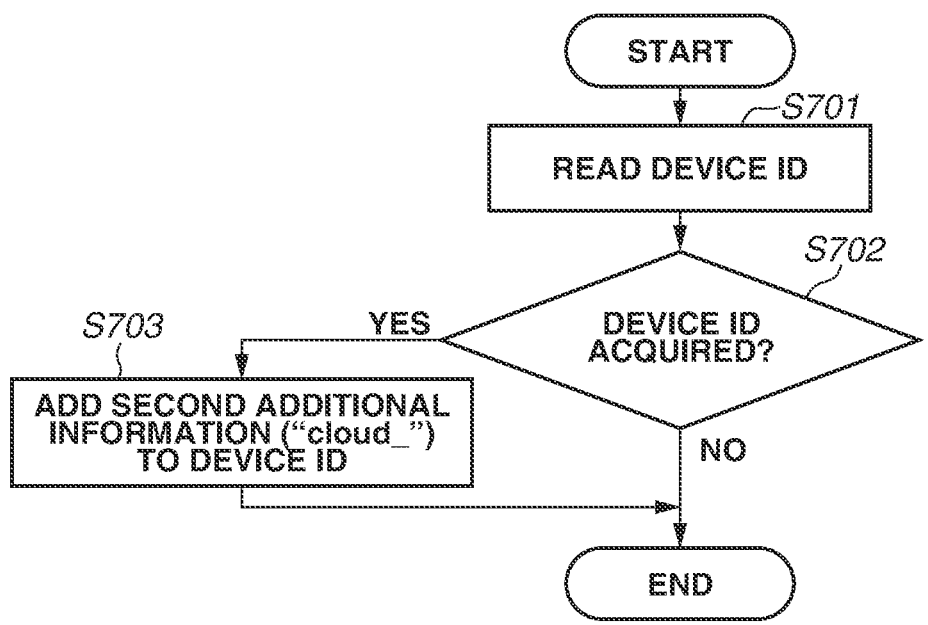

If the cloud print service 321 receives the device ID of the cloud-print-compliant printer 104 from the outside via the network 106, and generates a cloud side print queue, the flow illustrated in FIG. 7A accordingly starts from step S701.

In step S701, the cloud print service 321 reads data in a region in which the device ID acquired from the cloud-print-compliant printer 104 is stored.

In step S702, the cloud print service 321 determines whether a device ID has been acquired from the cloud-print-compliant printer 104. In a case where a device ID has not been acquired (NO in step S702), the processing illustrated in FIG. 7A ends.

In a case where a device ID has been acquired (YES in step S702), the processing proceeds to step S703. In step S703, the cloud print service 321 adds second additional information ("cloud_") to the device ID, and stores the resultant character string into device information. The processing in step S703 is executed by the second additional information addition processing unit 32105 of the cloud print service 321.

In the present exemplary embodiment, a character string indicating "cloud_" is added as the second additional information. A character string to be added as second additional information may be another character string including one or more characters, numbers, or symbols. As described above, in the cloud print service 321, a predetermined character string is added to a device ID of a registered printer. With this configuration, a device ID with the added predetermined character string can be identified as a device ID of a printer registered in the cloud print service 321.

Next, an example of installing the print setting extension application 312 in a case where the user performs a setup operation of a cloud print printer on the client terminal 101 will be described with reference to FIG. 5.

In step S501, the OS 313 of the client terminal 101 receives, via the input-output control unit 31300, a cloud print printer setup operation performed by the user.

The setup operation of a cloud print printer includes the following operations, for example. The user issues a printer search instruction to the client terminal 101. The OS 313 searches printers registered in the cloud print service 321, and printers connected to the network 106. The OS 313 transmits an acquisition request of printer information registered in the cloud print service 321. The cloud print service 321 displays, on the client terminal 101, a login screen for logging into the cloud print service 321. Then, the cloud print service 321 receives a user ID, a password, and an authentication request from the client terminal 101, performs user authentication based on the received user ID and password, and returns an authentication result to the client terminal 101. In a case where the client terminal 101 accesses the cloud print service 321 using an access token, user authentication may be performed without displaying the login screen. After user authentication succeeds, the cloud print service 321 transmits a list of printer information associated with a tenant ID to which the login user belongs, to the client terminal 101. The OS 313 also transmits a search packet to the network 106, and detects a printer connected to the network 106, based on a response packet of the search packet. The OS 313 displays, as a list, printer information acquired from the cloud print service 321, and printer information detected by searching the network 106, and receives the selection of printer information from the user. The above-described operation is an example of a printer setup operation received in step S501. In FIG. 5, printer information of the cloud-print-compliant printer 104 that has been received from the cloud print service 321 is selected.

Next, in step S502, the OS 313 transmits a printer setup request to the cloud print service 321. The printer setup request includes an acquisition request of capability information and a device ID of the cloud-print-compliant printer 104.

In step S503, in response to the printer setup request, the cloud print service 321 transmits a device ID to which second additional information is added by the second additional information addition processing (step S1004 in FIG. 10), to the OS 313.

In step S504, the OS 313 installs the cloud printer driver 311 based on the setup operation of a cloud print printer that has been received from the user in step S501. The install of the cloud printer driver 311 may be started based on the printer setup operation, or may be started based on the acquisition of the device ID in step S503.

In step S505, the OS 313 generates a print queue associated with the installed cloud printer driver 311, in the client terminal 101.

In step S506, the OS 313 further performs first additional information addition processing on the received device ID with second additional information. The first additional information indicates large classification of an application. That is to say, the first additional information indicates the classification of the type of an application adapted to a connected device. In the present exemplary embodiment, for distinguishing from applications of other devices, the OS 313 adds first additional information ("print_") indicating that an application to be installed is an application adapted to a printer, to a device ID.

The "print_" is an example, and may be another character string, numbers, or symbols.

In a case where a device ID of the cloud-print-compliant printer 104 is "device001", the device ID having been subjected to the second additional information addition processing and the first additional information addition processing accordingly becomes "print_cloud_device001".

In step S507, the OS 313 transmits a search request of an extended setup information file including a targeted device ID, to the online support service 351 via the extended setup information file search unit 31302. In this step, the OS 313 transmits a character string set by connecting the first additional information, the second additional information, and the device ID, to the online support service 351 as a device ID.

In step S508, because the online support service 351 stores an extended setup information file including the targeted device ID, the online support service 351 accordingly returns the extended setup information file (FIG. 14A) to the OS 313.

In step S509, the OS 313 detects an application ID from the acquired extended setup information file. By executing the processing in step S509, an application ID of the print setting extension application 312 for cloud print is detected.

In step S510, the OS 313 transmits an application request to the application management service 331 using the detected application ID.

In step S511, the application management service 331 returns the print setting extension application 312 having an application ID identical to the application ID included in the received application request.

In step S512, the OS 313 installs the acquired print setting extension application 312 in association with the client side print queue. In step S512, the OS 313 associates the print queue generated in step S505, and the application ID of the print setting extension application 312. With this configuration, each time the print queue generated in step S505 is called, the associated print setting extension application 312 can be activated.

In step S501 in the above description, printer information registered in the cloud print service 321 is searched. Based on a search instruction received by the client terminal 101, printers connected via the network 106 and printers registered in the cloud print service 321 may be both searched.

Figure 13A:
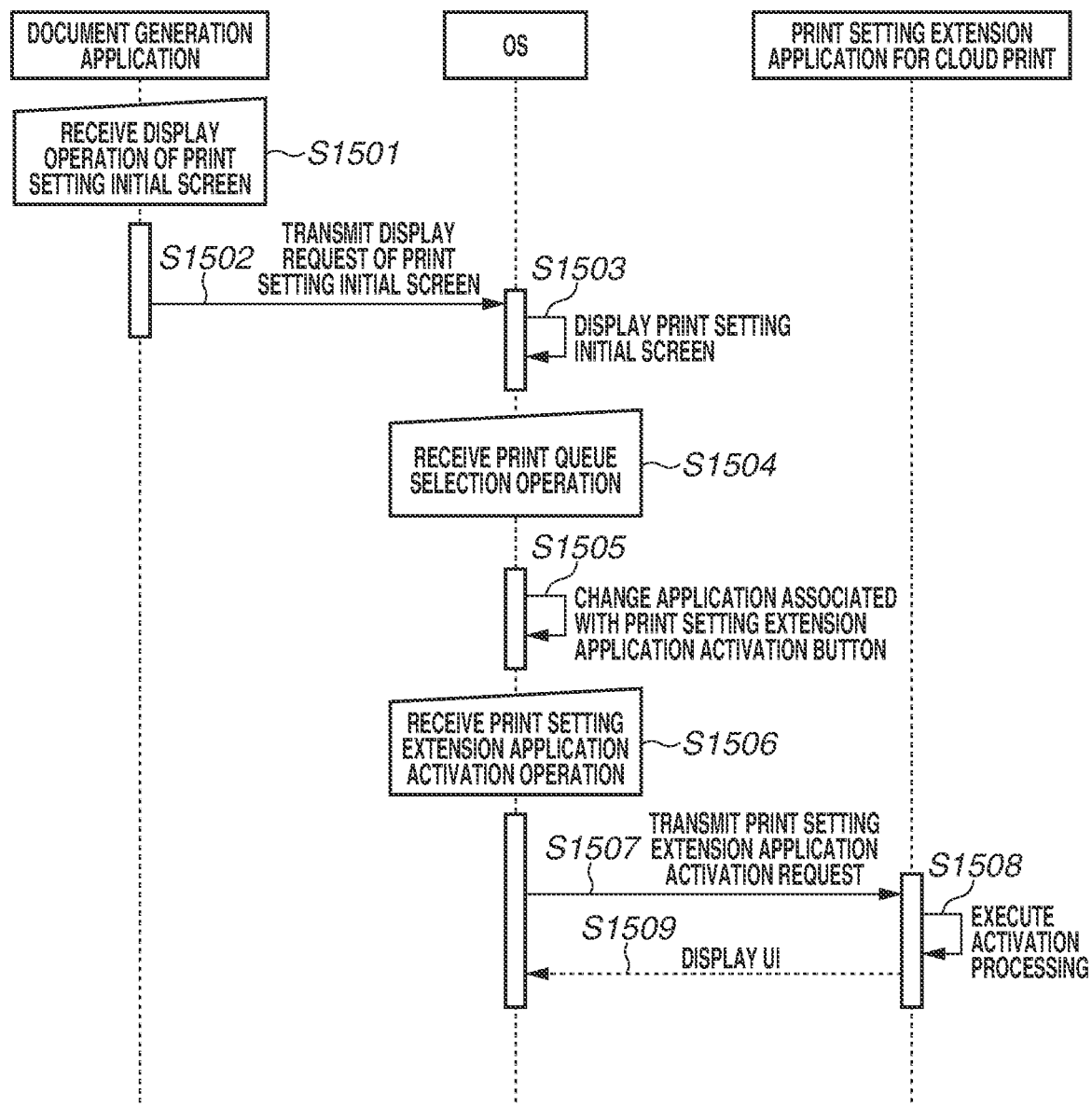
FIGS. 13A and 13B are diagrams each illustrating an example of a sequence of processing to be performed between each software component and a service in activating a print setting extension application according to the first exemplary embodiment.

Next, an example of a sequence of processing to be performed in activating the print setting extension application 312 and making a print setting according to the present exemplary embodiment will be described below with reference to FIG. 13A. Referring to FIG. 13A, the description will be given of an example of processing to be performed in a case where the user generates document data using the document generation application 315, and issues a printing instruction in the document generation application 315.

In step S1501, the document generation application 315 receives, via the UI unit 31501, a print setting initial screen display operation performed by the user.

In step S1502, the document generation application 315 transmits a display request of a print setting initial screen to the OS 313. In step S1503, the OS 313 displays a print setting screen (FIG. 15E) for selecting a print queue, as a print setting initial screen. FIG. 15E illustrates a print setting initial screen to be displayed by the OS 313. A region 1741 is a region for selecting a print queue to be used in printing. If the user selects the region 1741, a list of print queues registered in the client terminal 101 is displayed. Print queues of printers registered in the cloud print service 321, and print queues of printers to which the client terminal 101 can transmit print jobs not via the cloud print service 321 are both displayed in the print queue list. An object 1742 is an object for activating the print setting extension application 312.

Next, in step S1504, the OS 313 receives, via the input-output control unit 31300, a selection operation of a print queue (region 1741 in FIG. 15E) that is performed by the user.

If a print queue is selected, in step S1505, the OS 313 sets application identification information of the print setting extension application 312 associated with the selected print queue, as information regarding the print setting extension application 312 associated with the object 1742. With this configuration, when the object 1742 is selected, the set print setting extension application 312 associated with the selected print queue can be activated. In this example, an application associated with an activation button is changed to the print setting extension application 312 for cloud print that is associated with the print queue of the cloud printer driver 311.

Next, in step S1506, the OS 313 receives, via the input-output control unit 31300, a print setting extension application activation operation performed by the user. In step S1506, by selecting the object 1742, the user performs an activation operation of the print setting extension application 312.

In step S1507, the OS 313 transmits an activation request to the print setting extension application 312 associated with the object 1742.

In step S1508, the print setting extension application 312 for cloud print generates a print setting screen extended in accordance with functions of the printer, as activation processing. In step S1509, the OS 313 displays, via the input-output control unit 31300, a UI of the print setting extension application 312 for cloud print as a new print setting screen. FIG. 15B is a diagram illustrating an example of a new print setting screen displayed by the print setting extension application 312. On this print setting screen, a sheet size, the number of copies, the orientation of printing, a setting of two-sided printing or one-sided printing, and a setting of postprocessing such as stapling and punching, which cannot be set on the print setting initial screen illustrated in FIG. 15E, can be set. If an "OK" button is selected on the print setting screen illustrated in FIG. 15B, the print setting initial screen illustrated in FIG. 15E is displayed. If the user selects a "print" button on the print setting initial screen illustrated in FIG. 15E, the cloud printer driver 311 generates a print job and transmits the print job to the cloud print service 321. The cloud-print-compliant printer 104 receives, from the cloud print service 321, the print job transmitted from the cloud print service 321, and executes print processing.

Next, an example case where the user performs a setup operation of a local print printer on the client terminal 101 in a case where the print setting extension application 312 for cloud print is registered in the application management service 331 will be described below with reference to FIG. 6. The local print is a printing method of directly transmitting a print job to the cloud-print-compliant printer 104 without using the cloud print service 321.

First of all, in step S601, the OS 313 receives, via the input-output control unit 31300, a printer setup operation performed by the user. The processing in step S601 is similar to the processing in step S501 of FIG. 5. The description will be given assuming that, in step S601, information regarding the cloud-print-compliant printer 104 detected based on a response to a search packet transmitted by the OS 313 to the network 106 is selected.

If the user selects a printer, in step S602, the OS 313 transmits a printer setup request to the cloud-print-compliant printer 104.

In step S603, in response to the printer setup request, the cloud-print-compliant printer 104 transmits a device ID to the OS 313.

In step S604, the OS 313 installs the local printer driver 314 based on the setup operation of a local print printer that has been received from the user in step S601.

In step S605, the OS 313 generates a client side print queue for the installed local printer driver 314.

In step S606, the OS 313 performs first additional information addition processing on the received device ID. The first additional information indicates large classification of a device ID, and is added for making identifiable the type of the device identified by the device ID. In this example, for distinguishing from device IDs of other devices, the OS 313 adds first additional information ("print_") indicating that the received device ID is a device ID corresponding to a printer, to the device ID. For example, in a case where an original device ID is "device001", a device ID having been subjected to the first additional information addition processing becomes "print_device001". The "print_" is an example, and may be another character string, numbers, or symbols.

Next, in step S607, the OS 313 transmits a search request of an extended setup information file including a targeted device ID, to the online support service 351 via the extended setup information file search unit 31302.

In step S608, because the online support service 351 does not store an extended setup information file including the targeted device ID, the online support service 351 returns "not applicable (N/A)" to the OS 313. When a print queue for local print is generated, because an extended setup file is not downloaded, the print setting extension application 312 is not acquired either.

Figure 6:
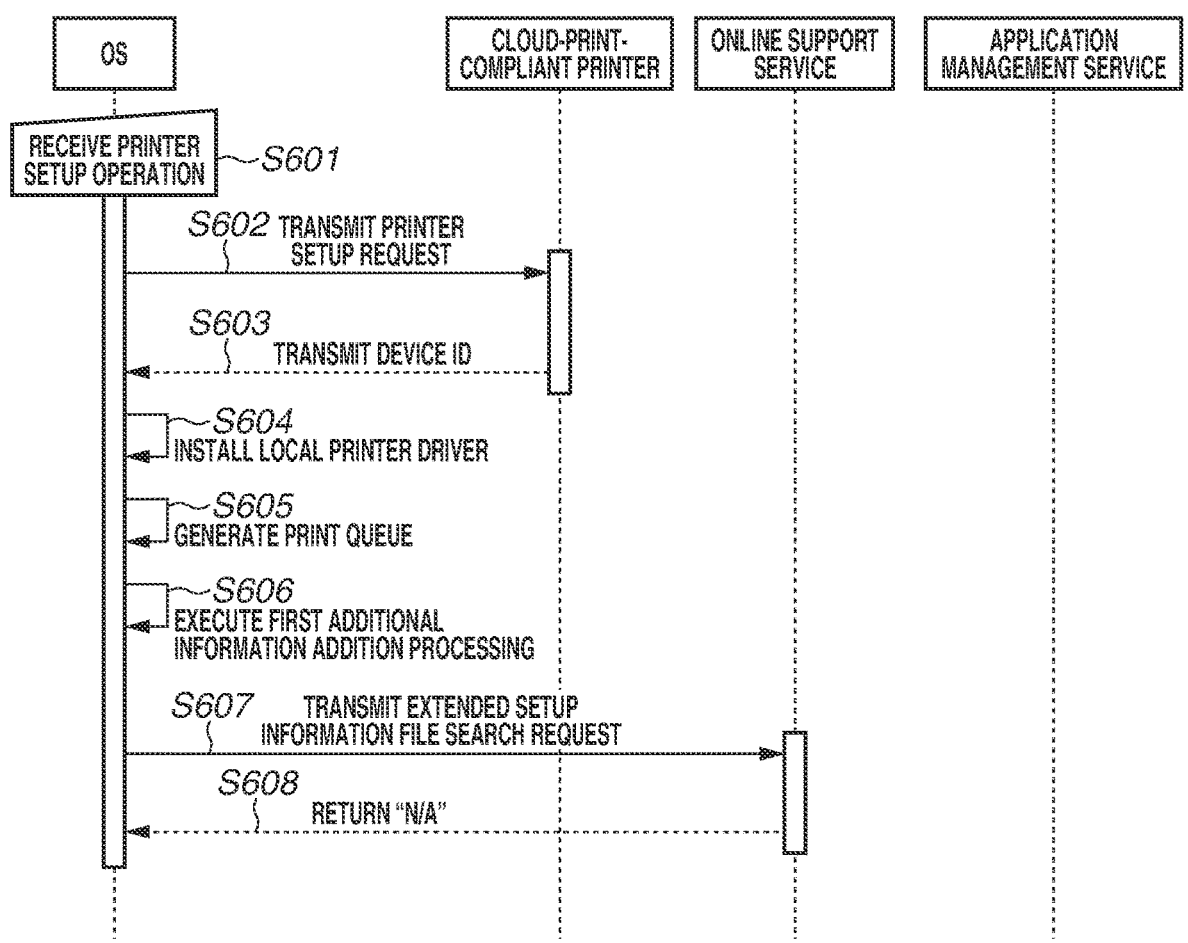
FIG. 6 is a diagram illustrating an example of a sequence of processing to be performed between each software component and a service in adding a local print printer according to the first exemplary embodiment.

It is assumed that a print queue generated in FIG. 6 is selected in the region 1741 on the print setting initial screen illustrated in FIG. 15E. Even if the processing illustrated in FIG. 6 is performed, the print setting extension application 312 is not installed, and the generated print queue and the print setting extension application 312 are not associated. Thus, in a case where the user selects the print queue generated in FIG. 6, on the print setting initial screen illustrated in FIG. 15E, the object 1742 is displayed in a grayout state. If the user selects the print queue generated in FIG. 6, and selects the "print" button illustrated in FIG. 15E, the local printer driver 314 generates a print job. The local printer driver 314 transmits the generated print job to the cloud-print-compliant printer 104. A print job generated by the local printer driver 314 is transmitted to the cloud-print-compliant printer 104 not via the cloud print service 321.

Both of FIGS. 5 and 6 illustrate processing of generating a print queue for transmitting a print job to the cloud-print-compliant printer 104. By varying a character string of a device ID received by the client terminal 101, control can be performed in such a manner that the print setting extension application 312 is installed only in either case.

As described above, by the OS 313 searching for an extended setup information file based on a device ID to which second additional information is added, install control of the print setting extension application 312 suitable for the type of a print queue can be performed.

In the first exemplary embodiment, first additional information if added to a device ID in the client terminal 101. The first additional information needs not be added.

In the first exemplary embodiment, the description has been given of an example in which the cloud print service 321 executes second additional information addition processing when a printer is registered into the cloud print service 321. In a second exemplary embodiment, second additional information addition processing is controlled in accordance with an acquisition source from which the OS 313 acquires a device ID. With this configuration, without adding second additional information in the cloud print service 321, processing to be performed when a print queue for cloud print is generated, and processing to be performed when a print queue for local print is generated can be varied.

Specific processing according to the second exemplary embodiment will be described with reference to FIGS. 4A, 7B, 8, 9, 10A, 10B, 13A, 14A to 14D, and 16A to 16E.

Only a difference from the first exemplary embodiment will now be described. Because a system configuration, a hardware configuration, and processing flows are the same as those of the first exemplary embodiment except for a part of them, the description thereof will be omitted.

FIGS. 16A to 16E are diagrams each illustrating an example of a software block according to the second exemplary embodiment. FIGS. 16A to 16E differ from FIGS. 3A to 3E in that the OS 313 includes a second additional information addition processing unit 31304, and the cloud print service 321 does not include a second additional information addition processing unit.

Figure 4A:
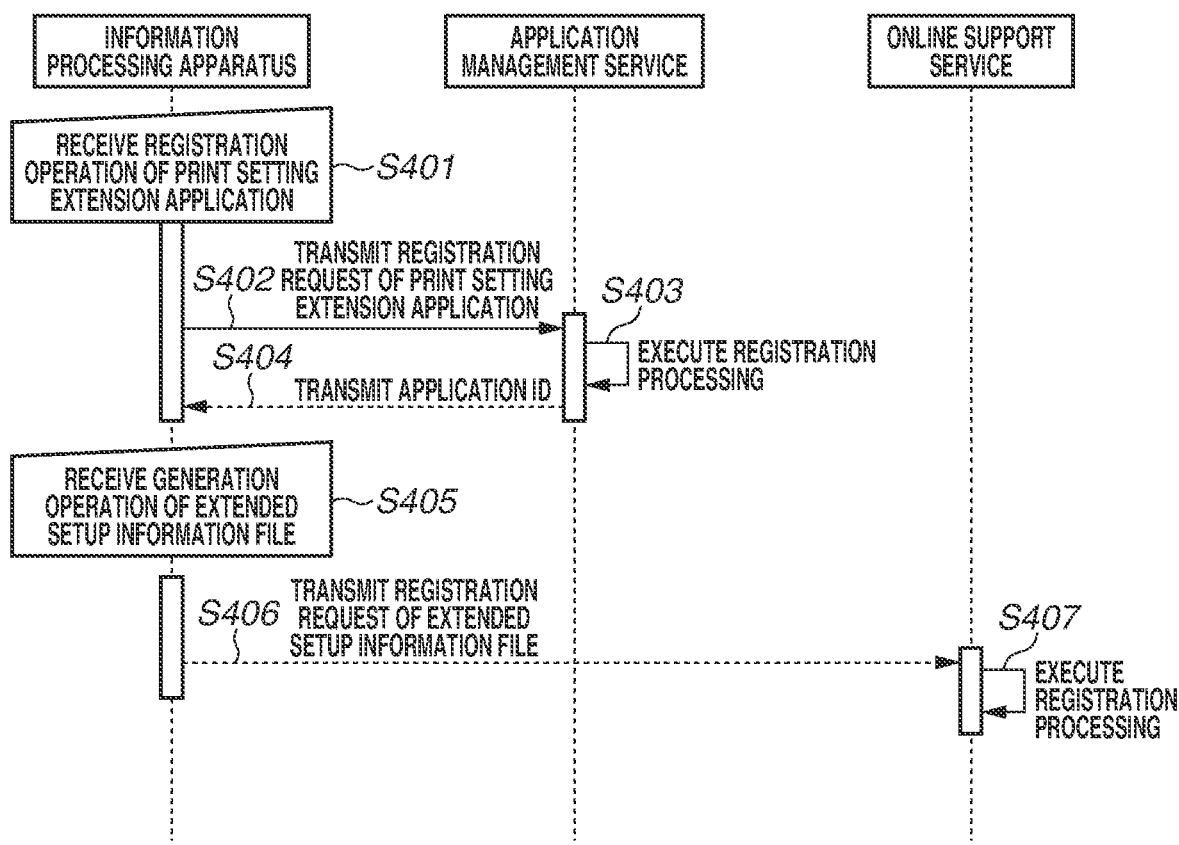

Because a sequence of registering the print setting extension application 312 into the application management service 331 that is performed by a print setting extension application registration operator according to the present exemplary embodiment is equivalent to the sequence illustrated in FIG. 4A, the description thereof will be omitted. The extended setup information file illustrated in FIG. 14A is stored in the application management service 331.

Because a sequence of activating the print setting extension application 312 and displaying a print setting screen according to the present exemplary embodiment is also equivalent to the sequence illustrated in FIG. 13A, the description thereof will be omitted.

An example of processing in which the user registers a printer into the cloud print service 321 will be described below with reference to FIG. 10B.

In step S1011, the cloud-print-compliant printer 104 receives, via the UI operation unit 34104, a printer registration operation performed by the user.

In step S1012, the cloud-print-compliant printer 104 transmits a printer registration request to the cloud print service 321 together with a device ID of the printer.

In step S1013, the cloud print service 321 that has received the printer registration request generates a cloud side print queue for the cloud-print-compliant printer 104. The processing in steps S1011 to S1013 is similar to the processing in steps S1001 to S1003 of FIG. 10A.

In step S1014, the cloud-print-compliant printer 104 receives, via the UI operation unit 34104, a printer registration confirmation operation performed by the user. In step S1015, the cloud-print-compliant printer 104 transmits a printer registration status request to the cloud print service 321.

Next, in step S1016, the cloud print service 321 returns a printer registration status to the cloud-print-compliant printer 104. Then, in step S1017, the cloud-print-compliant printer 104 displays the printer registration status on the UI operation unit 34104. The processing in steps S1014 to S1017 is similar to the processing in steps S1005 to S1008 of FIG. 10A. Because the processing in steps S1014 to S1017 is processing for confirming whether registration of printer information has been completed, the processing needs not be performed.

Next, an example of installing the print setting extension application 312 in a case where the user issues an addition instruction of a cloud print printer will be described below with reference to FIG. 8.

In step S801, the OS 313 receives, via the input-output control unit 31300, a cloud print printer setup operation performed by the user. The description will be given assuming that printer information of the cloud-print-compliant printer 104 that has been acquired from the cloud print service 321 is selected from among pieces of detected printer information.

In step S802, the OS 313 transmits a printer setup request to the cloud print service 321.

In step S803, in response to the printer setup request, the cloud print service 321 transmits a device ID to the OS 313.

In step S804, the OS 313 installs the cloud printer driver 311 based on the setup operation of a cloud print printer that has been received from the user in step S801.

In step S805, the OS 313 generates a client side print queue for the installed cloud printer driver 311. The processing in steps S801 to S805 described so far is similar to the processing in steps S501 to S505 of FIG. 5.

Next, in step S806, the OS 313 performs second additional information addition processing on the device ID. The sequence differs from that of the first exemplary embodiment in the processing in step S806. In this example, because the device ID is a device ID acquired from the cloud print service 321, the OS 313 adds second additional information ("cloud_") to the device ID. The details of the second additional information addition processing (step S806) performed at this time will be described below with reference to FIG. 7B.

In step S807, the OS 313 further performs first additional information addition processing on the device ID. The first additional information indicates large classification of a device ID. That is to say, the first additional information indicates the classification corresponding to a connected device. In this example, for distinguishing from other devices, the OS 313 adds first additional information ("print_") indicating that an application to be installed is an application adapted to a printer, to a device ID. The "print_" is an example, and may be another character string, numbers, or symbols.

In a case where a device ID of the cloud-print-compliant printer 104 is "device001", as a result of the processing in steps S806 and S807, the device ID becomes "print_cloud_device001".

In step S808, the OS 313 transmits a search request of an extended setup information file including a targeted device ID, to the online support service 351 via the extended setup information file search unit 31302.

In step S809, because the online support service 351 stores an extended setup information file including the targeted device ID, the online support service 351 accordingly returns the extended setup information file (FIG. 14A) to the OS 313.

In step S810, the OS 313 detects an application ID from the acquired extended setup information file. As a result of the processing in step S810, an application ID of the print setting extension application 312 for cloud print is detected.

In step S811, the OS 313 transmits an application request to the application management service 331 using the detected application ID.

In step S812, the application management service 331 returns the print setting extension application 312 having an application ID identical to the application ID included in the received application request.

In step S813, the OS 313 installs the acquired print setting extension application 312 in association with the client side print queue. The processing in steps S807 to S813 is similar to the processing in steps S506 to S512 of FIG. 5.

Next, the details of the second additional information addition processing (step S806) executed by the OS 313 will be described below with reference to FIG. 7B. All the processing illustrated in FIG. 7B is implemented by programs of the OS 313 stored in the storage unit 214 of the client terminal 101 being loaded onto the memory 213 and executed by the CPU 212.

Figure 7B:
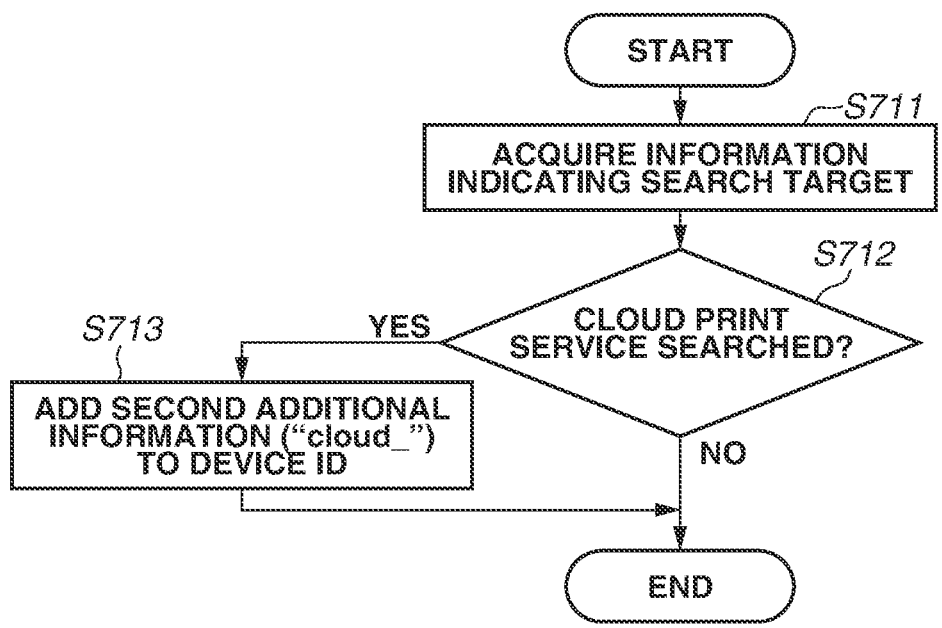

If the OS 313 installs the cloud printer driver 311 or the local printer driver 314 and generates a client side print queue, the flow illustrated in FIG. 7B accordingly starts from step S711.

First, in step S711, the OS 313 acquires information indicating a search target. More specifically, the information indicates whether the cloud print service 321 has been searched, or the cloud-print-compliant printer 104 has been directly searched for the purpose of local print. The information indicating a search target is associated with the printer information displayed on the client terminal 101 in step S801. In step S711, the OS 313 acquires information indicating a search target that is associated with printer information selected by the user.

Next, in step S712, based on the information acquired in step S711, the OS 313 determines whether a print queue has been detected by searching the cloud print service 321.

In a case where a print queue has been detected by searching the cloud print service 321 (YES in step S712), the processing proceeds to step S713. In step S713, the OS 313 adds second additional information ("cloud_") to the device ID.

On the other hand, in a case where it is determined in step S712 that the cloud-print-compliant printer 104 has been directly searched for the purpose of local print (NO in step S712), the OS 313 ends the processing illustrated in FIG. 7B without adding second additional information to the device ID. The "cloud_" is an example, and may be another character string, numbers, or symbols.

Next, an example of installing the print setting extension application 312 in a case where the user issues an addition instruction of a local print printer in a case where the print setting extension application 312 for cloud print is registered in the application management service 331 will be described below with reference to FIG. 9.

First, in step S901, the OS 313 receives, via the input-output control unit 31300, a local print printer setup operation performed by the user. It is assumed that printer information of the cloud-print-compliant printer 104 detected based on a response to a search packet output to the network 106 is selected from among pieces of printer information displayed as a list.

Next, in step S902, the OS 313 transmits a printer setup request to the cloud-print-compliant printer 104.

Next, in step S903, in response to the printer setup request, the cloud-print-compliant printer 104 transmits a device ID to the OS 313.

Next, in step S904, the OS 313 installs the local printer driver 314 based on the setup operation of a local print printer that has been received from the user in step S901.

Next, in step S905, the OS 313 generates a client side print queue for the installed local printer driver 314. The processing in steps S901 to S905 is similar to the processing in steps S601 to S605 of FIG. 6.

Next, in step S906, the OS 313 performs second additional information addition processing on the received device ID. In this step, the processing described above with reference to FIG. 7B is executed. In FIG. 9, because a print queue for local print is selected, second additional information is not added.

Next, in step S907, the OS 313 further performs first additional information addition processing on the device ID. The first additional information indicates large classification of a device. That is to say, the first additional information indicates the classification of a connected device. In this example, for distinguishing from applications of other devices, the OS 313 adds first additional information ("print_") indicating that an application to be installed is an application adapted to a printer, to a device ID. In a case where an original device ID is "device001", a device ID having been subjected to the first additional information addition processing accordingly becomes "print_device001".

The "print_" is an example, and may be another character string, numbers, or symbols.

Next, in step S908, the OS 313 transmits a search request of an extended setup information file including a targeted device ID, to the online support service 351 via the extended setup information file search unit 31302.

In step S909, because the online support service 351 does not store an extended setup information file including the targeted device ID, the online support service 351 accordingly returns "N/A" to the OS 313. Thus, in a case where a print queue for cloud print is generated, the print setting extension application 312 for cloud print is installed, and in a case where a print queue for local print is generated, the print setting extension application 312 for cloud print is not installed. The processing in steps S907 to S909 is similar to the processing in steps S606 to S608 of FIG. 6.

As described above, in the second exemplary embodiment, the OS 313 adds second additional information to a device ID.

With this configuration, install control of the print setting extension application 312 suitable for the type of a print queue can be performed without adding second additional information by the cloud print service 321.

In the first exemplary embodiment, the description has been given of an example in which a print setting extension application registration operator registers only the print setting extension application 312 for cloud print into the application management service 331. In a third exemplary embodiment, the description will be given of an example in which a print setting extension application registration operator registers a plurality of print setting extension applications into the application management service 331.

For example, cloud print is expected to be used in a business setting. Thus, the print setting extension application 312 for cloud print is expected to include a UI (1711 in FIG. 15B) that enables various print settings, or an authentication UI (1721 in FIG. 15C) for logging into the cloud print service 321. On the other hand, because local print is often used by consumers, the print setting extension application 312 for local print is expected to differ in a UI (1701 in FIG. 15A) limited to basic settings, or differ in that an authentication UI for logging into the cloud print service 321 is unnecessary. Thus, for one printer, two print setting extension applications 312 (one for cloud print and the other for local print) are sometimes registered into the application management service 331.

In view of the foregoing, in the present exemplary embodiment, a print setting extension application registration operator registers such two print setting extension applications 312 into the application management service 331. Then, control is performed in such a manner that an application to be installed varies depending on whether a print queue is a print queue for cloud print or a print queue for local print.

Specific processing according to the present exemplary embodiment will be described with reference to FIGS. 4B, 5, 10A, 11, 13A, 13B, 14A, 14B, and 15A to 15E.

Only a difference from the first exemplary embodiment will now be described. Because a system configuration, a hardware configuration, software configuration, and processing flows are the same as those of the first exemplary embodiment except for a part of them, the description thereof will be omitted.

First, an example of processing in which a print setting extension application registration operator registers the print setting extension application 312 and an extended setup information file into the application management service 331 according to the present exemplary embodiment will be described below with reference to FIG. 4B.

In this example, the description will be given of an example in which a print setting extension application registration operator registers the print setting extension application 312 for cloud print and the print setting extension application 312 for local print into the application management service 331. Because the processing flow in steps S411 to S417 up to the registration of the print setting extension application 312 for cloud print and the registration of the extended setup information file (File_A) is equivalent to the processing flow in steps S401 to S407 of FIG. 4A, the description thereof will be omitted.

Next, in step S418, the information processing apparatus receives, via the input-output control unit 31300, a registration operation of the print setting extension application 312 for local print that is performed by the print setting extension application registration operator.

Next, in step S419, the information processing apparatus transmits a registration request of the print setting extension application 312 for local print to the application management service 331.

Next, in step S420, the application management service 331 registers the print setting extension application 312 for local print, and generates an application ID as an ID of the registered print setting extension application 312 for local print.

Next, in step S421, the application management service 331 transmits the generated application ID to the print setting extension application registration operator via the input-output control unit 31300 of the information processing apparatus, which is a registration request source.

In step S422, the information processing apparatus receives, via the input-output control unit 31300, a registration operation of an extended setup information file created by the print setting extension application registration operator. In the extended setup information file, a plurality of printers (i.e., device IDs) can be combined with one application ID.

At this time, the print setting extension application registration operator describes a device ID having been subjected to the second additional information addition processing, into the extended setup information file. Nevertheless, in this example, an application to be registered into the application management service 331 is an application for local print. Thus, a character string set by adding first additional information to a device ID of the cloud-print-compliant printer 104, and not adding second additional information is described in the extended setup file as a device ID.

FIG. 14B illustrates an example of an extended setup information file in which a device ID is described considering that "second additional information is not added to a device ID of a local print printer in second additional information addition processing". In this example, in a case where an application ID (AppID) of the print setting extension application 312 for local print is "000EFG", a device ID is described considering that nothing is added to the device ID in second additional information addition processing, and "print_" is added thereto in first additional information addition processing.

Next, in step S423, the OS 313 transmits a registration request of an extended setup information file to the online support service 351.

Then, in step S424, the online support service 351 registers the extended setup information file.

Because a sequence of processing in which the user registers a printer into the cloud print service 321 is equivalent to the sequence illustrated in FIG. 10A, the description thereof will be omitted.

Because processing performed when a print queue of the cloud print service 321 is generated in the client terminal 101 is similar to the processing illustrated in FIG. 5, the description thereof will be omitted. In the present exemplary embodiment, in step S507 of FIG. 5, a device ID "print-_cloud_device001" is transmitted to the online support service 351, and in step S508, the extended setup file illustrated in FIG. 14A is acquired. Because a sequence of activating the print setting extension application 312 and displaying a print setting screen according to the present exemplary embodiment is equivalent to the sequence illustrated in FIG. 13A, the description thereof will be omitted.

Figure 11:
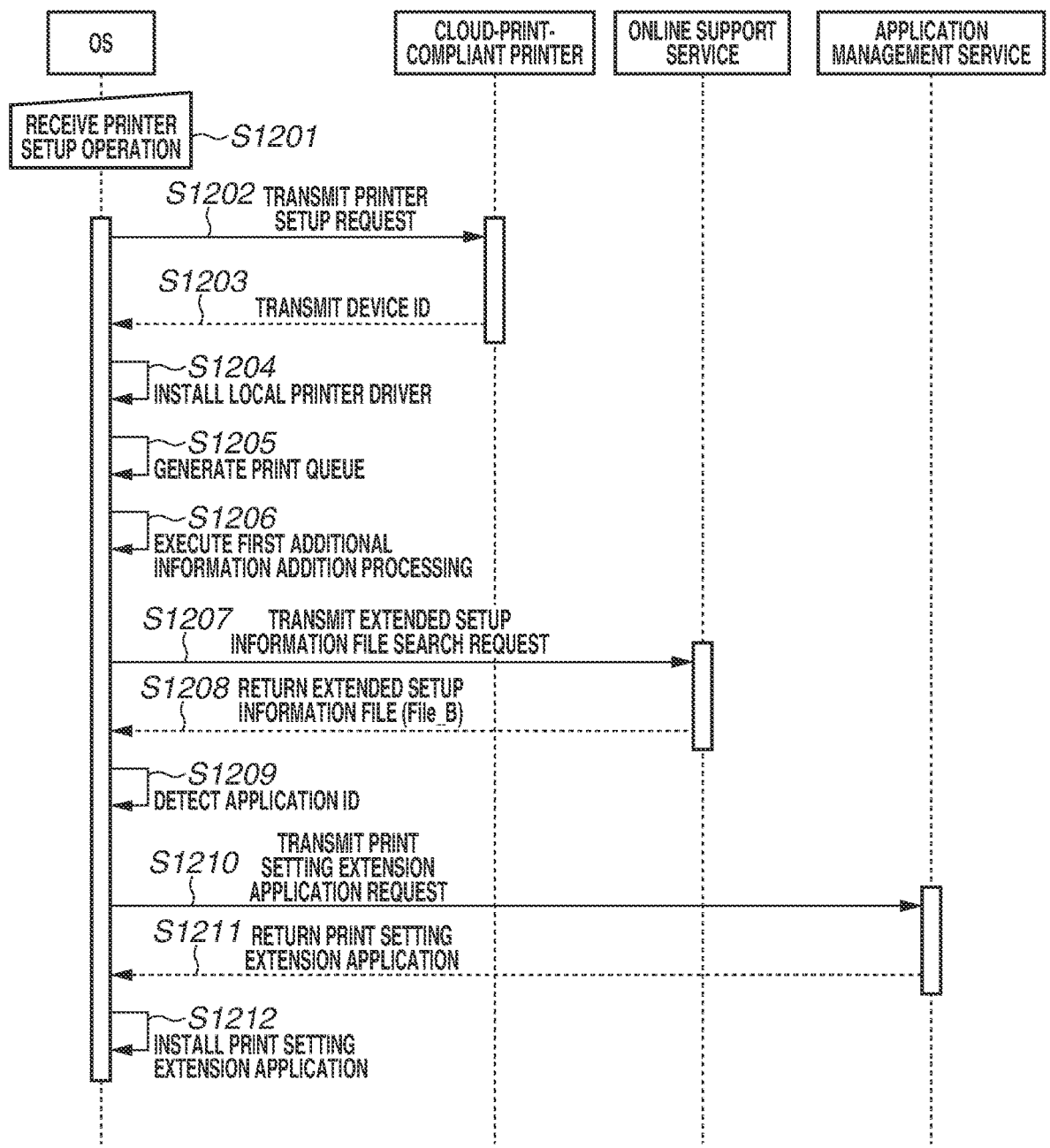
FIG. 11 is a diagram illustrating an example of a sequence of processing to be performed between each software component and a service in adding a local print printer according to the third exemplary embodiment.

Next, an example of installing the print setting extension application 312 in a case where the user performs a setup operation of a local print printer in the client terminal 101 will be described with reference to FIG. 11. Because the processing in steps S1201 to S1207 is equivalent to the processing in steps S601 to S607 of FIG. 6, the description thereof will be omitted. In step S1207, a device ID transmitted to the online support service 351 is "print_device001" to which first additional information has been added.

In step S1208, in response to an extended setup information search request from the OS 313, the online support service 351 returns an extended setup information file (File_B) including a targeted device ID.

Next, in step S1209, the OS 313 detects an application ID from the acquired extended setup information file (File_B). An application ID of the print setting extension application 312 for local print is accordingly detected.

Next, in step S1210, the OS 313 transmits an application request to the application management service 331 using the detected application ID.

Next, in step S1211, the application management service 331 returns the print setting extension application 312 having an application ID identical to the application ID included in the received application request.

Then, in step S1212, the OS 313 installs the acquired print setting extension application 312 in association with the client side print queue.

In this manner, a device ID transmitted to the online support service 351 is varied between print queues for transmitting print jobs to the same cloud-print-compliant printer 104. The client terminal 101 can thereby install applications with different application IDs.

Next, an example of a sequence of activating the print setting extension application 312 and displaying a print setting screen according to the present exemplary embodiment will be described below with reference to FIG. 13B.

First of all, in step S1521, the document generation application 315 receives, via the UI unit 31501, a print setting initial screen display operation performed by the user.

Next, in step S1522, the document generation application 315 transmits a display request of a print setting initial screen to the OS 313.

In step S1523, the OS 313 displays a print setting screen (FIG. 15E) for selecting a print queue, as a print setting initial screen.

Next, in step S1524, the OS 313 receives, via the input-output control unit 31300, a selection operation of a print queue (region 1741 in FIG. 15E) performed by the user.

Next, in step S1525, the OS 313 sets application identification information of the print setting extension application 312 associated with the selected print queue, as information regarding the print setting extension application 312 associated with the object 1742. In the present exemplary embodiment, an application associated with an activation button is changed to the print setting extension application 312 for local print that is associated with the print queue of the local printer driver 314.

Next, in step S1526, the OS 313 receives, via the input-output control unit 31300, a print setting extension application activation operation performed by the user.

Next, in step S1527, the OS 313 transmits an activation request to the print setting extension application 312 for local print that is associated with the activation button.

Next, in step S1528, the print setting extension application 312 for local print generates a print setting screen extended in accordance with functions of the printer, as activation processing.

In step S1529, the OS 313 displays, via the input-output control unit 31300, a UI of the print setting extension application 312 for local print as a new print setting screen. FIG. 15A illustrates a print setting screen displayed by the print setting extension application 312 for local print. Because the print setting screens illustrated in FIGS. 15A and 15B are displayed by different applications, screens including different settable items are displayed. In this manner, different applications can be activated as an application for local print and an application cloud print.

In this manner, in the present exemplary embodiment, in the case of using an extended setup information file in which a device ID with second additional information indicating the type of a print queue is described, the print setting extension application 312 for cloud print is installed. On the other hand, in the case of using an extended setup information file in which a device ID without second additional information indicating the type of a print queue is described, the print setting extension application 312 for local print is installed. Thus, in a case where a print queue for cloud print is generated, the print setting extension application 312 for cloud print is installed, and in a case where a print queue for local print is generated, the print setting extension application 312 for local print is installed.

By the cloud print service 321 adding second additional information to a device ID, even in a case where a plurality of print setting extension applications exists for one printer, install control of the print setting extension application 312 suitable for the type of a print queue can be performed.

In the third exemplary embodiment, the description has been given of an example in which, second additional information is not added to a device ID of a local print printer in second additional information addition processing.

In a fourth exemplary embodiment, different pieces of second additional information are added to a device ID of a local print printer and a device ID of a cloud print printer. By adding different pieces of second additional information, different extended setup files including different device IDs can be acquired.

Specific processing according to the fourth exemplary embodiment will be described with reference to FIGS. 4B, 7C, 8, 10B, 12, 13A, 13B, 14A, 14C, and 16A to 16E. Only a difference from the third exemplary embodiment will now be described. Because a system configuration, a hardware configuration, and processing flows are the same as those of the first exemplary embodiment except for a part of them, the description thereof will be omitted.

A software configuration differs from that of the first exemplary embodiment in that the OS 313 includes the second additional information addition processing unit 31304 as illustrated in FIG. 16 not the cloud print service 321.

Because a sequence of registering the print setting extension application 312 and an extended setup information file into the application management service 331 that is performed by a print setting extension application registration operator according to the present exemplary embodiment is equivalent to the sequence illustrated in FIG. 4B, the description thereof will be omitted.

The extended setup information files illustrated in FIGS. 14A and 14C are stored in the application management service 331. Because the extended setup information file illustrated in FIG. 14A is similar to that described above, the description thereof will be omitted.

FIG. 14C illustrates an example of an extended setup information file in which a device ID is described considering that "second additional information is added also to a device ID of a local print printer in second additional information addition processing". An application ID (AppID) "000EFG" of a print setting extension application for local print is described. The device ID described in the file is "print_local_device001" considering that ("local_") is added in second additional information addition processing, and "print_" is added in first additional information addition processing.

Because the processing in which the user registers a printer into the cloud print service 321 is equivalent to the sequence illustrated in FIG. 10B, the description thereof will be omitted.

Figure 8:
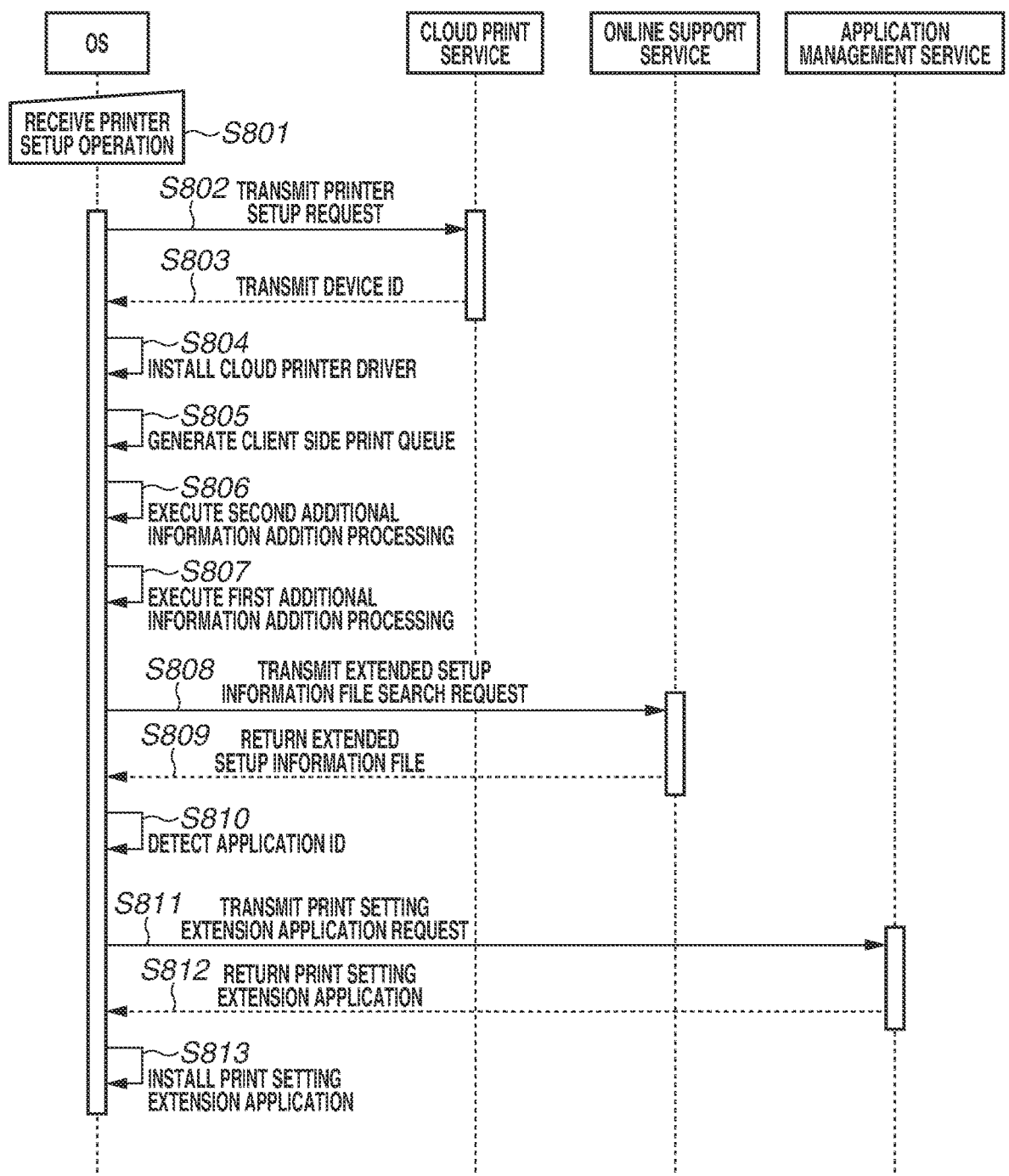
FIG. 8 is a diagram illustrating an example of a sequence of processing to be performed between each software component and a service in adding a cloud print printer according to the second exemplary embodiment.

Because processing to be performed when a print queue for cloud print is generated is similar to the processing illustrated in FIG. 8, except for the details of the processing performed in step S806, the description thereof will be omitted.

Next, the details of the second additional information addition processing (step S806) executed by the OS 313 will be described below with reference to FIG. 7C.

All the processing illustrated in FIG. 7C is implemented by programs of the OS 313 stored in the storage unit 214 of the client terminal 101 being loaded onto the memory 213 and executed by the CPU 212.

If the OS 313 installs the cloud printer driver 311 or the local printer driver 314 and generates a client side print queue, the flow illustrated in FIG. 7C accordingly starts from step S721.

First of all, in step S721, the OS 313 acquires information indicating a search target of selected printer information.

Next, in step S722, referring to the information acquired in step S721, the OS 313 determines whether the cloud print service 321 has been searched. In a case where the cloud print service 321 has been searched (YES in step S722), the processing proceeds to step S723. In step S723, the OS 313 adds second additional information ("cloud_") to the device ID.

On the other hand, in a case where the cloud-print-compliant printer 104 has been directly searched for the purpose of local print (NO in step S722), the processing proceeds to step S724. In step S724, the OS 313 adds second additional information ("local_") to the device ID. The "cloud_" and "local_" are examples, and may be other character strings, numbers, or symbols.

Next, processing to be performed in a case where the user issues an addition instruction of printer information for local print according to the present exemplary embodiment will be described with reference to FIG. 12.

Figure 9:
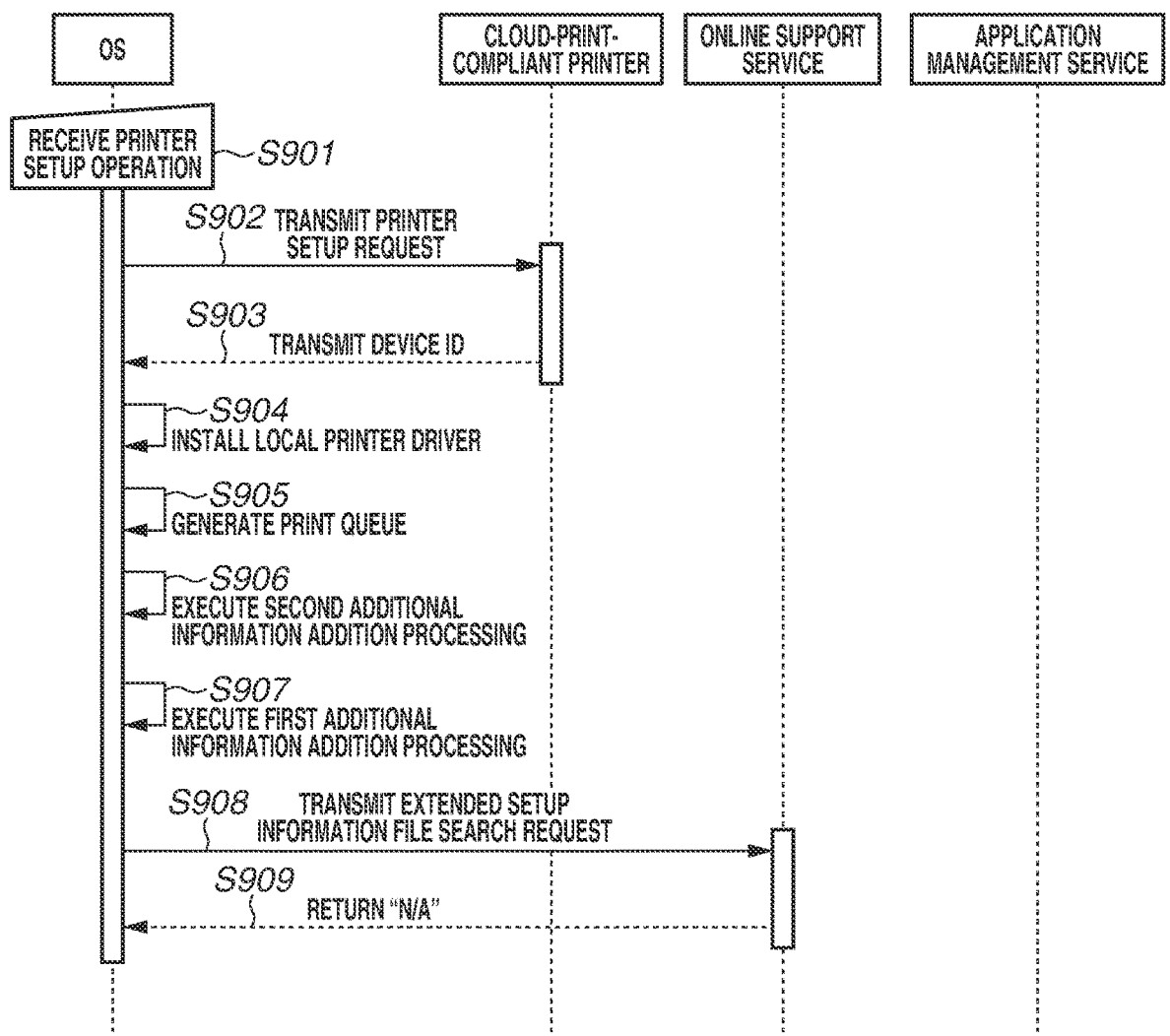
FIG. 9 is a diagram illustrating an example of a sequence of processing to be performed between each software component and a service in adding a local print printer according to the second exemplary embodiment.

Because the processing in steps S1401 to S1405 is equivalent to the processing in steps S901 to S905 of FIG. 9, the description thereof will be omitted.

After the processing in step S1405, in step S1406, the OS 313 performs the second additional information addition processing illustrated in FIG. 7C, on the device ID. In this example, because the OS 313 directly transmits a setup request to the cloud-print-compliant printer 104 for local print, second additional information ("local_") is added to the device ID.

Next, the OS 313 executes the processing in step S1407 and subsequent steps. Because the processing in steps S1407 and S1408 is equivalent to the processing in steps S907 and S908 of FIG. 9, the description thereof will be omitted. At this time, as a result of the first additional information addition processing (step S1407), a device ID having been subjected to the first additional information addition processing becomes "print_local_device001" in a case where an original device ID is "device001".

In step S1409, in response to a search request transmitted in step S1408, the online support service 351 returns an extended setup information file (File_B) including a targeted device ID.

In step S1410, the OS 313 detects an application ID from the acquired extended setup information file (File_B). An application ID of the print setting extension application 312 for local print is accordingly detected.

In step S1411, the OS 313 transmits an application request to the application management service 331 using the detected application ID.

In step S1412, the application management service 331 returns the print setting extension application 312 having an application ID identical to the application ID included in the received application request.

In step S1412, the OS 313 installs the acquired print setting extension application 312. As a result, in the case of using an extended setup information file in which a device ID with second additional information indicating the type of a print queue for cloud print is described, the print setting extension application 312 for cloud print is installed.

As illustrated in FIGS. 7C, 8, and 12, in the present exemplary embodiment, second additional information to be added to a device ID is varied depending on an acquisition source of printer information selected by the user. With this configuration, an extended setup information file suitable for an acquisition source of printer information can be acquired. Consequently, an application suitable for an acquisition source of printer information can be installed.

Figure 13B:
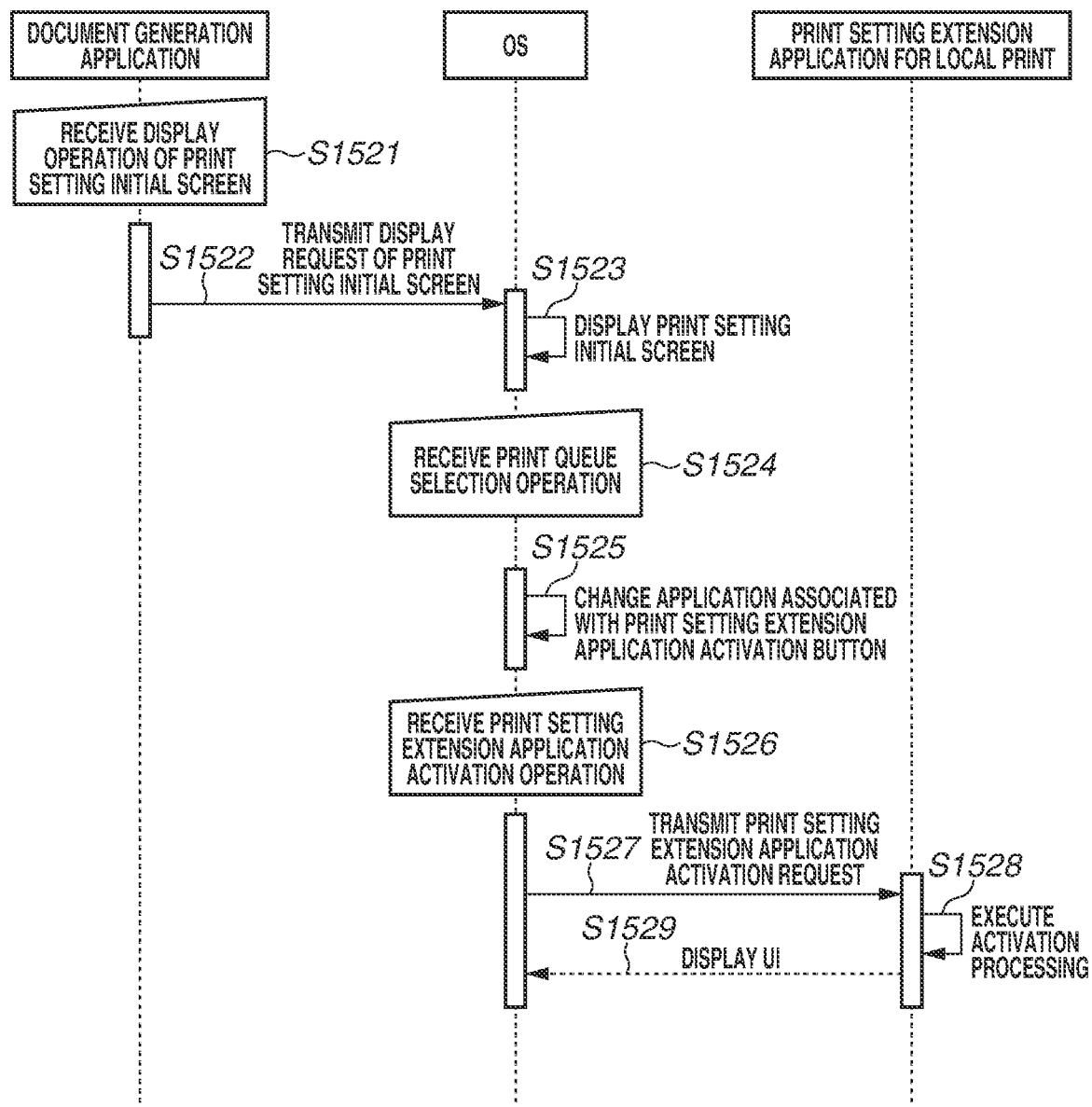
Figure 17A:
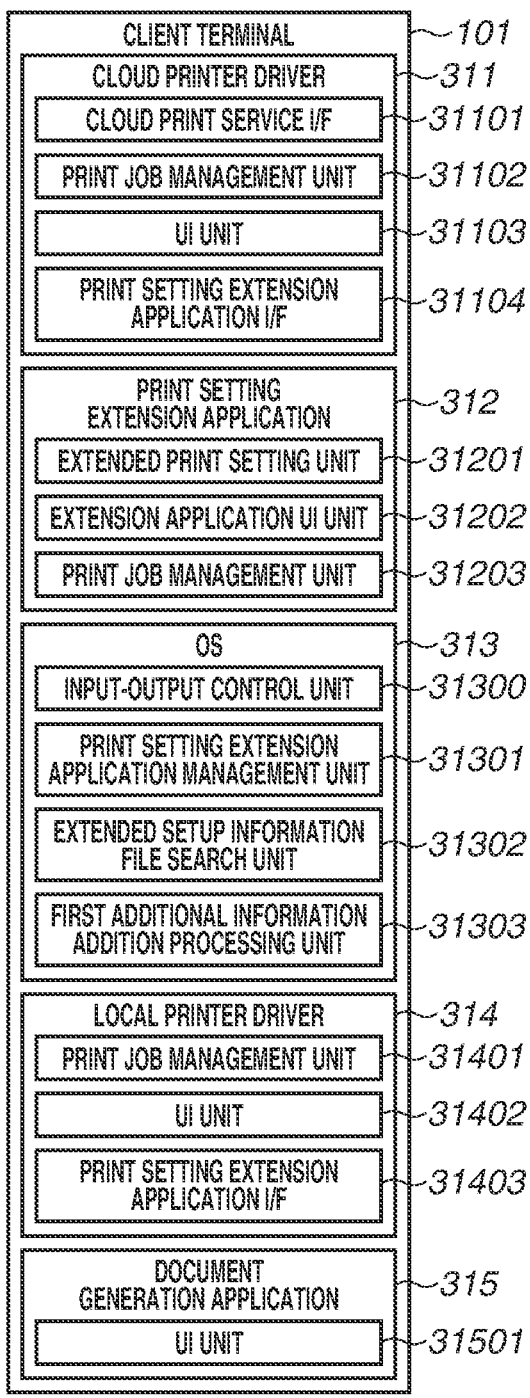
FIGS. 17A to 17E are diagrams each illustrating an example of a software configuration according to a fifth exemplary embodiment.
Figure 17B:
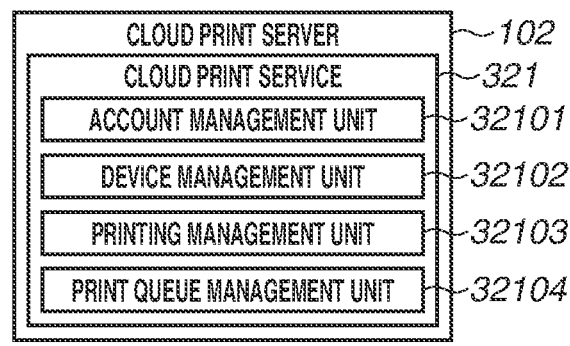
Figure 17C:
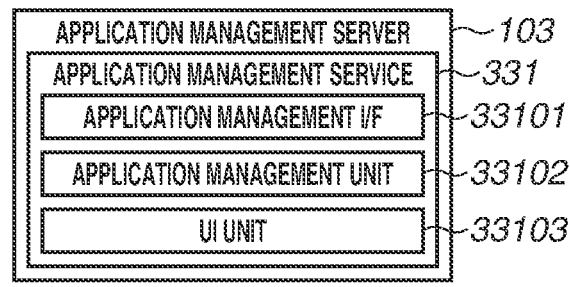
Figure 17D:
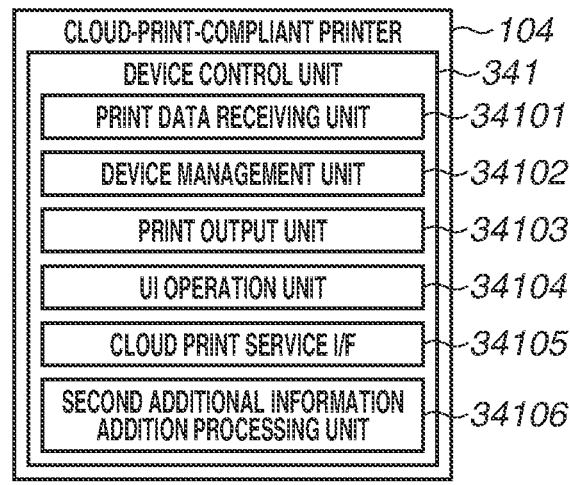
Figure 17E:
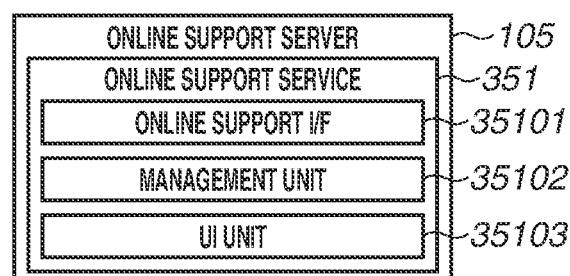

Because the processing of activating the print setting extension application 312 and displaying a print setting screen according to the present exemplary embodiment is equivalent to the sequences illustrated in FIGS. 13A and 13B, the description thereof will be omitted.

As described above, by the OS 313 adding different pieces of second additional information to device IDs, in a case where a plurality of print setting extension applications 312 exists for one printer, install control of each print setting extension application 312 suitable for the type of a print queue can be performed.

In the first exemplary embodiment, the description has been given of an example in which the cloud print service 321 executes second additional information addition processing when a printer is registered into the cloud print service 321.

In a fifth exemplary embodiment, the description will be given of an example in which the cloud-print-compliant printer 104 executes second additional information addition processing in a case where a print setting extension application registration operator registers a plurality of print setting extension applications 312 into the application management service 331.

Specific processing according to the fifth exemplary embodiment will be described with reference to FIGS. 4B, 5, 7D, 10C, 13A, 13B, 14A, 14B, 15D, and 17A to 17E.

Only a difference from the first exemplary embodiment will now be described. Because a system configuration, a hardware configuration, software configuration, and processing flows are the same as those of the first exemplary embodiment except for a part of them, the description thereof will be omitted.

A software configuration differs from that of the first exemplary embodiment in that the cloud-print-compliant printer 104 includes a second additional information addition processing unit 34106 as illustrated in FIG. 17 not the cloud print service 321.

Because a sequence of registering the print setting extension application 312 into the application management service 331 that is performed by a print setting extension application registration operator according to the present exemplary embodiment is equivalent to the sequence illustrated in FIG. 4B, the description thereof will be omitted.

The extended setup information files illustrated in FIGS. 14A and 14B are stored in the application management service 331.

Figure 10C:
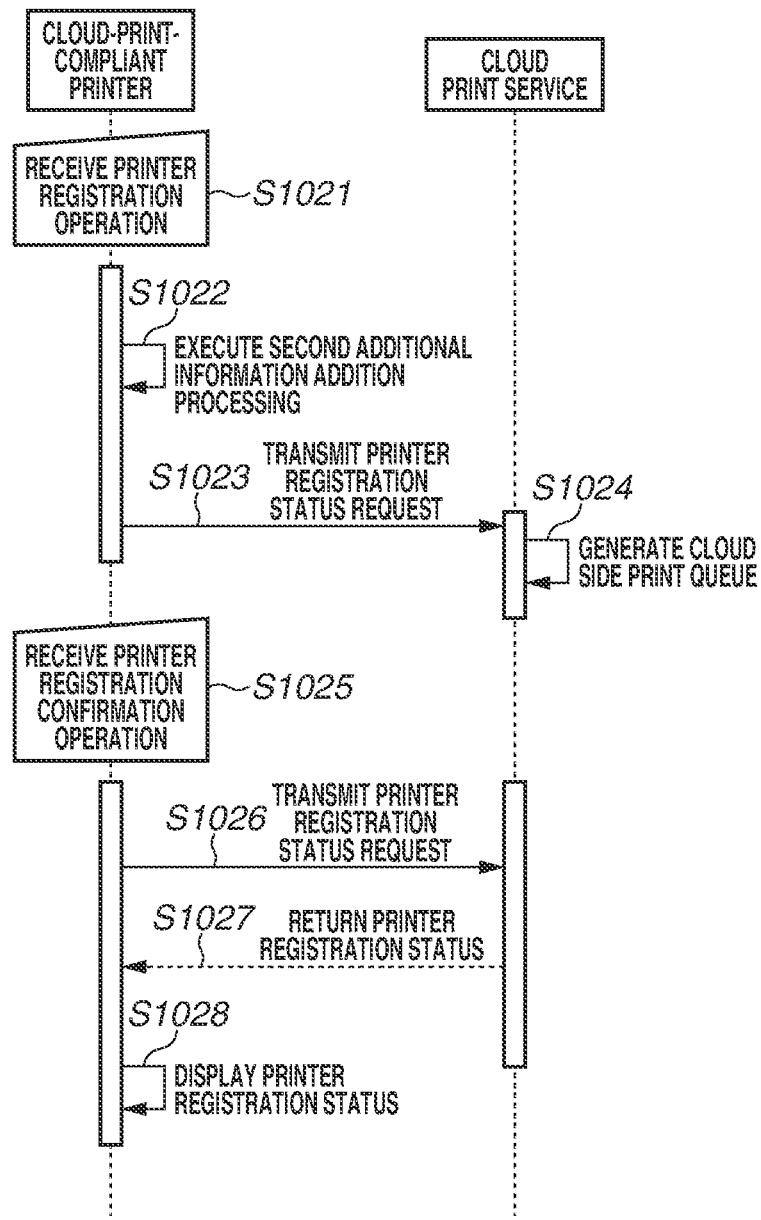

An example of processing in which the user registers a printer into the cloud print service 321 will be described below with reference to FIG. 10C. First of all, in step S1021, the cloud-print-compliant printer 104 receives, via the UI operation unit 34104, a printer registration operation performed by the user.

Next, in step S1022, the cloud-print-compliant printer 104 performs second additional information addition processing on a device ID. The details of the second additional information addition processing (step S1022) performed in this step will be described with reference to FIG. 7D. In this example, because an instruction of registration into the cloud print service 321 is transmitted, the cloud-print-compliant printer 104 adds second additional information ("cloud_") to the device ID.

In step S1023, the cloud-print-compliant printer 104 transmits a printer registration request to the cloud print service 321 together with the device ID with the second additional information.

In step S1024, the cloud print service 321 that has received the printer registration request registers the cloud-print-compliant printer 104, and generates a cloud side print queue for the cloud-print-compliant printer 104.

In step S1025, the cloud-print-compliant printer 104 receives, via the UI operation unit 34104, a printer registration confirmation operation performed by the user.

In step S1026, the cloud-print-compliant printer 104 transmits a printer registration status request to the cloud print service 321.

In step S1027, the cloud print service 321 returns a printer registration status to the cloud-print-compliant printer 104.

Then, in step S1028, the cloud-print-compliant printer 104 displays the printer registration status on the UI operation unit 34104.

Next, the details of the second additional information addition processing (step S1022) executed by the cloud-print-compliant printer 104 will be described below with reference to FIG. 7D. All the processing illustrated in FIG. 7D is implemented by programs of the device control unit 341 stored in the storage unit 244 of the cloud-print-compliant printer 104 being loaded onto the memory 243 and executed by the CPU 242.

If the cloud-print-compliant printer 104 receives an instruction of registration into the cloud print service 321, the flow illustrated in FIG. 7D accordingly starts from step S731.

First, in step S731, the cloud-print-compliant printer 104 acquires extension information of a device ID. The extension information of a device ID is information set from a screen displayed on the operation unit 247 of the cloud-print-compliant printer 104. FIG. 15D illustrates an example of a setting screen of device ID extension information. By the user selecting an object 1751, ON/OFF of device ID extension can be switched. The user sets extension information of a device ID by setting ON/OFF of device ID extension and selecting an "OK" button.

In step S732, the cloud-print-compliant printer 104 determines whether an extension instruction of a device ID has been issued, based on the information acquired in step S731.

In a case where an extension instruction of a device ID has been issued (YES in step S732), the processing proceeds to step S733. In step S733, the cloud-print-compliant printer 104 adds second additional information ("cloud_") to the device ID. The "cloud_" is an example, and may be another character string, numbers, or symbols.

In a case where an extension instruction of a device ID has not been issued (NO in step S732), the cloud-print-compliant printer 104 ends the processing without adding second additional information to the device ID.

Because a sequence of installing the print setting extension application 312 in a case where the user issues an addition instruction of a cloud print printer is the same as the sequence illustrated in FIG. 5, the description thereof will be omitted. Because a sequence of installing the print setting extension application 312 in a case where the user issues an addition instruction of a local print printer is the same as the sequence illustrated in FIG. 11, the description thereof will be omitted.

Because a sequence of activating the print setting extension application 312 and displaying a print setting screen according to the present exemplary embodiment is also equivalent to the sequences illustrated in FIGS. 13A and 13B, the description thereof will be omitted.

In the present exemplary embodiment, the description has been given of an example in which the user preliminarily issues an instruction to add second additional information to a device ID, via the UI operation unit 34104 of the cloud-print-compliant printer 104. The cloud-print-compliant printer 104 may automatically execute second additional information addition processing. More specifically, when a printer ID is transmitted to the cloud print service 321, an ID to which second additional information is added may be transmitted as a device ID without making a setting via the operation unit 247 of the cloud-print-compliant printer 104.

For example, as a conceivable method, the cloud-print-compliant printer 104 may automatically execute second additional information addition processing being triggered by processing in which the user registers the cloud-print-compliant printer 104 into the cloud print service 321. In this case, the user needs not preliminarily issue an instruction to add second additional information to a device ID, via the UI operation unit 34104 of the cloud-print-compliant printer 104.

As a result, in the case of using an extended setup information file in which a device ID with second additional information indicating the type of a print queue for cloud print is described, the print setting extension application 312 for cloud print is installed.

In the case of using an extended setup information file in which a device ID without second additional information indicating the type of a print queue is described, the print setting extension application 312 for local print is installed.

Thus, in a case where a print queue for cloud print is generated, the print setting extension application 312 for cloud print is installed, and in a case where a print queue for local print is generated, the print setting extension application 312 for local print is installed.

As described above, the cloud-print-compliant printer 104 may add second additional information to a device ID. By switching whether to add second additional information, in a case where a plurality of print setting extension applications 312 exists for one printer, install control of each print setting extension application 312 suitable for the type of a print queue can be performed.

As described above, by installing the printing setting extension application 312 suitable for the type of a print queue, in accordance with an input route of a print job to be executed by one image forming apparatus, information regarding the image forming apparatus stored in an information processing apparatus can be extended.

Other Exemplary Embodiments

An exemplary embodiment of the present disclosure is also implemented by executing the following processing. More specifically, the processing is processing of supplying software (program) for executing functions of the above-described exemplary embodiments, to a system or an apparatus via a network or various storage media, and a computer (or CPU, micro processing unit (MPU), etc.) of the system or the apparatus reading out and executing a program code. In this case, embodiments of the present disclosure include the computer program and a storage medium storing the computer program.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-069516, filed Apr. 16, 2021, which is hereby incorporated by reference herein in its entirety.

What is claimed is:

1. An information processing apparatus comprising:
a first driver that generates print data to be transmitted to an image forming apparatus not via a cloud server;
a second driver that generates print data to be transmitted to the image forming apparatus via the cloud server; and
a controller including a processor, the controller causing the information processing apparatus to:
receive, from the image forming apparatus, identification information of the image forming apparatus;
acquire first information regarding a first print setting extension application based on the received identification information, the first print setting extension application extending a function of the first driver;
download the first print setting extension application based on the acquired first information regarding the first print setting extension application;
receive, from a predetermined server apparatus, the identification information of the image forming apparatus;
generate another identification information by adding predetermined information corresponding to cloud printing to the identification information received from the predetermined server apparatus;
acquire information regarding a second print setting extension application based on the generated another identification information, the second print setting extension application extending a function of the second driver, the second print setting extension application allowing a user to set a print setting cannot set by the first print setting extension application; and
download the second print setting extension application based on the acquired information regarding the second print setting extension application.

2. The information processing apparatus according to claim 1, wherein the controller further causes the information processing apparatus to:
detect one or a plurality of image forming apparatuses connected to a same network as the information processing apparatus; and display information regarding the one or plurality of detected image forming apparatuses, wherein the image forming apparatus is selected from the displayed information regarding the one or plurality of detected image forming apparatuses.

3. The information processing apparatus according to claim 1, wherein the print setting that cannot be set by the first print setting extension application includes a staple setting.

4. The information processing apparatus according to claim 1, wherein the print setting that cannot be set by the first print setting extension application includes a punch setting.

5. The information processing apparatus according to claim 1, wherein the first information regarding the first print setting extension application is associated with the image forming apparatus, and wherein the information regarding a second print setting extension application is associated with the image forming apparatus based on the generated another identification information.

6. The information processing apparatus according to claim 1, wherein the controller further causes the information processing apparatus to:

transmit, to the image forming apparatus not via the cloud server, a print setting value set by the first print setting extension application; and transmit, to the image forming apparatus via the cloud server, a print setting value set by the second print setting extension application.

7. The information processing apparatus according to claim 1, wherein the predetermined information corresponding to cloud printing is characters indicating cloud.

8. A control method of an information processing apparatus which comprises a first driver that generates print data to be transmitted to an image forming apparatus not via a cloud server and a second driver that generates print data to be transmitted to the image forming apparatus via the cloud server, the control method comprising:

receiving, from the image forming apparatus that has received the first request, identification information of the image forming apparatus;

acquiring first information regarding a first print setting extension application based on the received identification information, the first print setting extension application for extending a function of the first driver;

downloading the first print setting extension application based on the acquired information regarding the first print setting extension application;

receiving, from a predetermined server apparatus, the identification information of the image forming apparatus;

generating another identification information by adding predetermined information corresponding to cloud printing to the identification information received from the predetermined server apparatus;

acquiring information regarding a second print setting extension application based on the generated another identification information, the second print setting extension application extending a function of the second driver, the second print setting extension application allowing a user to set a print setting cannot set by the first print setting extension application; and downloading the second print setting extension application based on the acquired information regarding the second print setting extension application.

9. A non-transitory computer readable storage medium for storing a computer program for causing an information processing apparatus to execute a control method, the information processing apparatus comprising a first driver that generates print data to be transmitted to an image forming apparatus not via a cloud server and a second driver that generates print data to be transmitted to the image forming apparatus via the cloud server, the control method comprising:

receiving, from the image forming apparatus, identification information of the image forming apparatus;

acquiring first information regarding a first print setting extension application based on the received identification information, the first print setting extension application extending a function of the first driver;

downloading the first print setting extension application based on the acquired information regarding the first print setting extension application;

receiving, from a predetermined server apparatus, the identification information of the image forming apparatus;

generating another identification information by adding predetermined information corresponding to cloud printing to the identification information received from the predetermined server apparatus;

acquiring information regarding a second print setting extension application based on the generated another identification information, the second print setting extension application extending a function of the second driver, the second print setting extension application allowing a user to set a print setting cannot set by the first print setting extension application; and downloading the second print setting extension application based on the acquired information regarding the second print setting extension application.

10. The non-transitory computer readable storage medium according to claim 9, wherein the control method further comprises:

detecting one or a plurality of image forming apparatuses connected to a same network as the information processing apparatus; and displaying information regarding the one or plurality of detected image forming apparatuses, wherein the image forming apparatus is selected from the displayed information regarding the one or plurality of detected image forming apparatuses.

11. The non-transitory computer readable storage medium according to claim 9, wherein the print setting that cannot be set by the first print setting extension application includes a staple setting.

12. The non-transitory computer readable storage medium according to claim 9, wherein the print setting that cannot be set by the first print setting extension application includes a punch setting.

13. The non-transitory computer readable storage medium according to claim 9, wherein the first information regarding the first print setting extension application is associated with the image forming apparatus, and wherein the information regarding a second print setting extension application is associated with the image forming apparatus based on the generated another identification information.

14. The non-transitory computer readable storage medium according to claim 9, wherein the control method further comprises:

transmitting, to the image forming apparatus not via the cloud server, a print setting value set by the first print setting extension application; and transmitting, to the image forming apparatus via the cloud server, a print setting value set by the second print setting extension application.

15. The non-transitory computer readable storage medium according to claim 9, wherein the predetermined information corresponding to cloud printing is characters indicating cloud.

* * * * *